(12) United States Patent
Ma et al.

(10) Patent No.: US 8,150,798 B2
(45) Date of Patent: Apr. 3, 2012

(54) METHOD AND SYSTEM FOR AUTOMATED COORDINATION AND ORGANIZATION OF ELECTRONIC COMMUNICATIONS IN ENTERPRISES

(75) Inventors: Moses Ma, San Francisco, CA (US); Kari Hovland, Oakland, CA (US); Lisa De Paschalis, Orinda, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 280 days.

(21) Appl. No.: 11/869,561

(22) Filed: Oct. 9, 2007

(65) Prior Publication Data
US 2008/0114847 A1    May 15, 2008

Related U.S. Application Data

(60) Provisional application No. 60/828,945, filed on Oct. 10, 2006.

(51) Int. Cl.
G06F 7/00 (2006.01)
G06Q 50/00 (2012.01)
(52) U.S. Cl. ........................................ 707/608; 705/310
(58) Field of Classification Search .................. None
See application file for complete search history.

(56) References Cited

U.S. PATENT DOCUMENTS

| | | |
|---|---|---|
| 6,289,382 B1 | 9/2001 | Bowman-Amuah |
| 6,332,163 B1 | 12/2001 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,473,794 B1 | 10/2002 | Guheen et al. |
| 6,477,580 B1 | 11/2002 | Bowman-Amuah |
| 6,496,850 B1 | 12/2002 | Bowman-Amuah |
| 6,513,059 B1 | 1/2003 | Gupta et al. |
| 6,529,948 B1 | 3/2003 | Bowman-Amuah |
| 6,536,037 B1 | 3/2003 | Guheen et al. |

(Continued)

FOREIGN PATENT DOCUMENTS

EP    953929    3/1999

(Continued)

OTHER PUBLICATIONS

Biennier, F. et al.; Collaborative Business and Data Privacy: Toward a Cyber-Control?; Computers in Industry vol. 56, No. 4 p. 361-70; Elsevier; May 2005; Netherlands.

(Continued)

*Primary Examiner* — Tarek Chbouki
(74) *Attorney, Agent, or Firm* — Foley & Lardner LLP

(57) ABSTRACT

A method and system for automated coordination and organization of electronic communications in enterprises optimizes a communications network, intelligently streamlining communications and enabling workflow within enterprise applications. The system allows a user to use whatever authoring tool the user is already familiar with, such as email or word-processing, to immediately publish that communication, making use of re-usable content and templates and then automatically routing that information vie the best channel to the intended recipient. The recipient is able to direct the format and mode of the incoming communications as well, based on sender, role, type, and action requirement. The underlying engine for streamlining communications injects underlying metadata so that emails are easier to manage and automate. Finally, the system collects information about the overall system in order to improve communication flow.

6 Claims, 35 Drawing Sheets

U.S. PATENT DOCUMENTS

| | | |
|---|---|---|
| 6,549,949 B1 | 4/2003 | Bowman-Amuah |
| 6,571,282 B1 | 5/2003 | Bowman-Amuah |
| 6,578,068 B1 | 6/2003 | Bowman-Amuah |
| 6,606,660 B1 | 8/2003 | Bowman-Amuah |
| 6,615,166 B1 | 9/2003 | Guheen et al. |
| 6,621,505 B1 | 9/2003 | Beauchamp et al. |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,643,652 B2 | 11/2003 | Helgeson et al. |
| 6,678,738 B2 | 1/2004 | Haverstock et al. |
| 6,678,882 B1 | 1/2004 | Hurley et al. |
| 6,691,153 B1 | 2/2004 | Hanson et al. |
| 6,697,824 B1 | 2/2004 | Bowman-Amuah |
| 6,704,873 B1 | 3/2004 | Underwood |
| 6,721,713 B1 | 4/2004 | Guheen et al. |
| 6,721,747 B2 | 4/2004 | Lipkin |
| 6,732,148 B1 | 5/2004 | Estrada et al. |
| 6,742,015 B1 | 5/2004 | Bowman-Amuah |
| 6,868,441 B2 | 3/2005 | Greene et al. |
| 6,904,449 B1 | 6/2005 | Quinones |
| 6,917,962 B1 | 7/2005 | Cannata et al. |
| 6,990,513 B2 | 1/2006 | Belfiore et al. |
| 7,020,686 B2 | 3/2006 | Banatwala |
| 7,020,697 B1 | 3/2006 | Goodman et al. |
| 7,043,486 B2 | 5/2006 | Cope |
| 7,051,071 B2 | 5/2006 | Stewart et al. |
| 7,051,072 B2 | 5/2006 | Stewart et al. |
| 2001/0039570 A1 | 11/2001 | Stewart et al. |
| 2001/0051985 A1 | 12/2001 | Haverstock et al. |
| 2002/0010741 A1 | 1/2002 | Stewart et al. |
| 2002/0023176 A1 | 2/2002 | Kwicinski |
| 2002/0038335 A1 | 3/2002 | Dong et al. |
| 2002/0038357 A1 | 3/2002 | Haverstock et al. |
| 2002/0042810 A1 | 4/2002 | Minami et al. |
| 2002/0049858 A1 | 4/2002 | Frietas et al. |
| 2002/0059425 A1 | 5/2002 | Belfiore et al. |
| 2002/0065879 A1 | 5/2002 | Ambrose et al. |
| 2002/0073236 A1 | 6/2002 | Helgeson et al. |
| 2002/0103883 A1 | 8/2002 | Haverstock et al. |
| 2002/0124109 A1 | 9/2002 | Brown |
| 2002/0128946 A1 | 9/2002 | Chehade et al. |
| 2002/0138582 A1 | 9/2002 | Chandra et al. |
| 2002/0138620 A1 | 9/2002 | Brown |
| 2002/0174191 A1 | 11/2002 | Robertson et al. |
| 2002/0194393 A1 | 12/2002 | Hrischuk et al. |
| 2003/0009385 A1* | 1/2003 | Tucciarone et al. ............ 705/26 |
| 2003/0014483 A1 | 1/2003 | Stevenson et al. |
| 2003/0014485 A1 | 1/2003 | Banatwala |
| 2003/105884 A1 | 6/2003 | Upton |
| 2003/0135558 A1 | 7/2003 | Bellotti et al. |
| 2003/0135559 A1 | 7/2003 | Bellotti et al. |
| 2003/0135659 A1 | 7/2003 | Bellotti et al. |
| 2003/0163585 A1 | 8/2003 | Elderon et al. |
| 2003/0177187 A1 | 9/2003 | Levine et al. |
| 2003/0197733 A1 | 10/2003 | Beauchamp et al. |
| 2003/0225839 A1* | 12/2003 | Kopunovic et al. ............ 709/206 |
| 2003/0229900 A1 | 12/2003 | Reisman |
| 2004/0019648 A1* | 1/2004 | Huynh et al. ................. 709/206 |
| 2004/0037259 A1* | 2/2004 | Steinberg ...................... 370/338 |
| 2004/0122730 A1* | 6/2004 | Tucciarone et al. ............ 705/14 |
| 2005/0010640 A1 | 1/2005 | Cannata et al. |
| 2005/0021629 A1 | 1/2005 | Cannata et al. |
| 2005/0021630 A1 | 1/2005 | Cannata et al. |
| 2005/0027800 A1 | 2/2005 | Erickson et al. |
| 2005/0027871 A1 | 2/2005 | Bradley et al. |
| 2005/0044197 A1 | 2/2005 | Lai |
| 2005/0081188 A1 | 4/2005 | Kumar et al. |
| 2005/0193063 A1 | 9/2005 | Cannata et al. |
| 2005/0246415 A1 | 11/2005 | Belfiore et al. |
| 2006/0059253 A1 | 3/2006 | Goodman et al. |
| 2006/0067250 A1 | 3/2006 | Boyer et al. |
| 2006/0271552 A1* | 11/2006 | McChesney et al. ............ 707/10 |
| 2006/0277544 A1* | 12/2006 | Bjoernsen et al. ............ 718/100 |
| 2007/0192422 A1* | 8/2007 | Stark et al. .................... 709/206 |
| 2007/0226038 A1* | 9/2007 | Das et al. ........................ 705/10 |
| 2008/0020364 A1* | 1/2008 | Wattendorf et al. .......... 434/322 |
| 2008/0097850 A1* | 4/2008 | Kristal et al. ................... 705/14 |

FOREIGN PATENT DOCUMENTS

| | | |
|---|---|---|
| EP | 955596 | 11/1999 |
| EP | 1003117 | 5/2000 |
| EP | 1079320 | 2/2001 |
| EP | 1241853 | 9/2002 |
| EP | 1339000 | 8/2003 |
| EP | 1363187 | 11/2003 |
| EP | 1457909 | 3/2004 |
| EP | 1431875 | 6/2004 |
| EP | 1437663 | 7/2004 |
| EP | 1457908 | 9/2004 |
| EP | 1484903 | 12/2004 |
| EP | 1503318 | 2/2005 |
| EP | 1264221 | 8/2005 |
| EP | 1569397 | 8/2005 |
| EP | 1632852 | 3/2006 |
| EP | 1632894 | 3/2006 |
| EP | 1632895 | 3/2006 |
| EP | 1647928 | 4/2006 |
| EP | 1653719 | 5/2006 |
| EP | 1662416 | 5/2006 |
| EP | 1672555 | 6/2006 |
| EP | 1675047 | 6/2006 |
| JP | 11098138 | 4/1999 |
| JP | 2001014252 | 1/2001 |
| JP | 2002183066 | 6/2002 |
| JP | 2003099398 | 4/2003 |
| JP | 2003122886 | 4/2003 |
| JP | 2003303179 | 10/2003 |
| JP | 2003323386 | 11/2003 |
| JP | 2004054811 | 2/2004 |
| JP | 2004227561 | 8/2004 |
| JP | 2005092872 | 4/2005 |
| JP | 2005196581 | 7/2005 |
| JP | 2005202926 | 7/2005 |
| JP | 2005237674 | 9/2005 |
| JP | 2005242899 | 9/2005 |
| JP | 2005267253 | 9/2005 |
| JP | 2005310177 | 11/2005 |
| JP | 2005353007 | 12/2005 |
| WO | WO0163449 | 8/2001 |
| WO | WO0173661 | 10/2001 |
| WO | WO0193043 | 12/2001 |
| WO | WO0198936 | 12/2001 |
| WO | WO0203296 | 1/2002 |
| WO | WO0210986 | 2/2002 |
| WO | WO0213007 | 2/2002 |
| WO | WO0217106 | 2/2002 |
| WO | WO0221318 | 3/2002 |
| WO | WO0221413 | 3/2002 |
| WO | WO02056147 | 7/2002 |
| WO | WO02097652 | 12/2002 |
| WO | WO03015055 | 2/2003 |
| WO | WO03025775 | 3/2003 |
| WO | WO03034183 | 4/2003 |
| WO | WO03034219 | 4/2003 |
| WO | WO03034285 | 4/2003 |
| WO | WO03067387 | 8/2003 |
| WO | WO03093946 | 11/2003 |
| WO | WO03102827 | 12/2003 |
| WO | WO2004015897 | 2/2004 |
| WO | WO2004017165 | 2/2004 |
| WO | WO2004032013 | 4/2004 |
| WO | WO2004044696 | 5/2004 |
| WO | WO2004084067 | 9/2004 |
| WO | WO2004095303 | 11/2004 |
| WO | WO2004102438 | 11/2004 |
| WO | WO2005001627 | 1/2005 |
| WO | WO2005001641 | 1/2005 |
| WO | WO2005017654 | 2/2005 |
| WO | WO2005038552 | 4/2005 |
| WO | WO2005059690 | 6/2005 |
| WO | WO2006026686 | 3/2006 |
| WO | WO2006028850 | 3/2006 |
| WO | WO2006031609 | 3/2006 |
| WO | WO2006052996 | 5/2006 |

OTHER PUBLICATIONS

Bussler, C.; The Application of Workflow Technology in Semantic B2B Integration; Distributed and Parallel Databases vol. 12, No. 2-3 p. 163-91; Kluwer Academic Publishers; Sep.-Nov. 2002; Netherlands.

Bussler, C.; The Role of B2B Protocols in Inter-Enterprise Process Execution; Technologies for E-Service. Second International Workshop, TES 2001. Proceedings (Lecture Notes in Computer Science vol. 2193) p. 16-29; Springer-Verlag, Berlin, Germany; 2001.

Caton, M.; Collaboration Tools Improve Workflow [Novell GroupWise 7.0]; IT Week vol. 8, No. 46 p. 26; VNU Business Publications; Dec. 5, 2005; UK.

Hu Heping et al.; Management System of Dynamic Workflow Based on Event-Response; Journal of Huazhong University of Science and Technology vol. 32, No. 4 p. 53-5; Editorial Board J. Huazhong Univ. of Sci. & Technol; Apr. 2004; China.

Jie Meng et al.; Flexible Inter-Enterprise Workflow Management Using E-Services; Proceedings Fourth IEEE International Workshop on Advanced Issues of E-Commerce and Web-Based Information Systems (WECWIS 2002) p. 43-50; IEEE Comput. Soc, Los Alamitos, CA, USA; 2002.

Kong, S.H. et al.; Internet-Based Collaboration System: Press-Die Design Process for Automobile Manufacturer; International Journal of Advanced Manufacturing Technology vol. 20, No. 9 p. 701-8; Springer-Verlag; 2002; UK.

Laleci, G.B. et al.; A Platform for Agent Behavior Design and Multi Agent Orchestration; Agent-Oriented Software Engineering V. $5^{th}$ International Workshop, AOSE 2004. Revised Selected Papers (Lecture Notes in Computer Science vol. 3382) p. 205-20; Springer-Verlag, Berlin, Germany; 2005.

Park, N.; Collaboration and Integration of the Shared Process System with Workflow Control; Production Planning and Control vol. 14, No. 8 p. 743-52; Taylor & Francis; Dec. 2003; UK.

Qiming Chen et al.; Inter-Enterprise Collaborative Business Process Management; Proceedings $17^{th}$ International Conference on Data Engineering p. 253-60; IEEE Comput. Soc, Los Alamitos, CA, USA; 2001.

Sadiq, S. et al.; Collaborative Business Process Management Through Harmonized Messaging; JIOS. Journal of Information and Organizational Sciences vol. 28, No. 1-2 p. 151-64; Univ. Zagreb; 2004; Croatia.

Su, S.Y.W. et al.; Dynamic Inter-Enterprise Workflow Management in a Constraint-Based E-Service Infrastructure; Electronic Commerce Research vol. 3, No. 1-2 p. 9-24; Kluwer Academic Publishers; 2003; Netherlands.

Vojdani, A.F.; Tools for Real-Time Business Integration and Collaboration; IEEE Transactions on Power Systems vol. 18, No. 2 p. 555-62; IEEE; May 2003; USA.

* cited by examiner

METHOD AND SYSTEM FOR AUTOMATED COORDINATION AND ORGANIZATION OF ELECTRONIC COMMUNICATIONS IN ENTERPRISES

CROSS REFERENCE TO RELATED APPLICATIONS

This application claims benefit of U.S. provisional patent application Ser. No. 60/828,945, filed Oct. 10, 2006, the entirety of which application is incorporated herein by this reference thereto.

BACKGROUND

1. Field of the Invention

The invention relates to enterprise communications systems and practices. More particularly, the invention relates to a method and system for automated coordination and organization of electronic communications in enterprises.

2. Description of Related Technology

To become more efficient and competitive, businesses and industries strive to capture and streamline the business and communication processes or workflows they use to operate their respective enterprises. Best practices in accounting, financial transaction processing, order processing, inventory management and purchasing have benefited greatly from the use of information technology. In these areas of largely professional and managerial work, computers have been used extensively to support the work of individuals. However, information technology has been more difficult to exploit in the arena of electronic collaboration among individuals. A handful of general approaches has been used in order to leverage technology in the service of managerial and professional work: communications and messaging software, workflow software and decision support software.

Communications and messaging software focuses on the need for communication among the many participants in managerial and professional work processes. It can be used to breach the organization boundaries, both within and among organization, and is adaptable to almost any set of organization circumstances. Such flexibility can be advantageous when the requirements for communication are poorly understood or constantly changing. However, there are costs incurred for this same flexibility—tools must be reduced to their lowest common denominator in terms of functionality and, generally, not customized to the group or task at hand. Such software usually restricts form and functionality in order to increase usability by the general market of users. Thus, although conventional software tools enable the fundamental transmission of communications, conventional tools do not organize, target or streamline such communications automatically or align to how people work.

Workflow software is grounded in the paper metaphor of document routing. As a result, workflow software is better suited to repetitive, clerical document-processing activities than managerial and professional work. In contrast to clerical activities in which most decision situations are well understood and can be made by a single individual, managerial and professional work often entails decisions in which a number of people need to collaborate. This essential need for collaboration is the root of the perceived need for the large number of management-level meetings and multiple messaging that take place in most organizations. Thus, although conventional software tools define the steps performed by the workflow, conventional tools do not organize such workflow and processes automatically.

Decision support uses information technology to support individual decision makers with data retrieval and data manipulation capabilities that can significantly enhance the quality of their decisions. However, decision support software does not attempt to structure the roles played in the decision by various individuals, nor does it usually structure the interdependencies of more than a few closely related decisions. Thus, although conventional software tools enable decision support, they do not perform decision analysis, decision sharing and optimization in the arena of workflow and work-related communication processes.

SUMMARY

A method and system for automated coordination and organization of electronic communications in enterprises optimizes a communications network, intelligently streamlining communications and enabling workflow within enterprise applications. The system allows a user to use whatever authoring tool the user is already familiar with, such as email or word-processing, to immediately publish a communication, making use of re-usable content and templates and then automatically routing that information via the best channel to the intended recipient. The recipient is able to direct the format and mode of the incoming communications as well, based on one or more of sender, role, type, and action requirement. The underlying engine for streamlining communications injects underlying metadata so that distribution lists are easier to manage and automate. Additionally, the system collects information about the overall system in order to improve communication flow.

BRIEF DESCRIPTION OF THE DRAWINGS

FIGS. 8-13 provide several views of a user interface to a messaging application from the system of FIG. 1;

FIGS. 20-22 provide several views of a user interface for rapid news publishing from the system of FIG. 1;

FIGS. 24-25 provide views of a user interface for integrated message reception from the system of FIG. 1.

DETAILED DESCRIPTION

Figure 1:
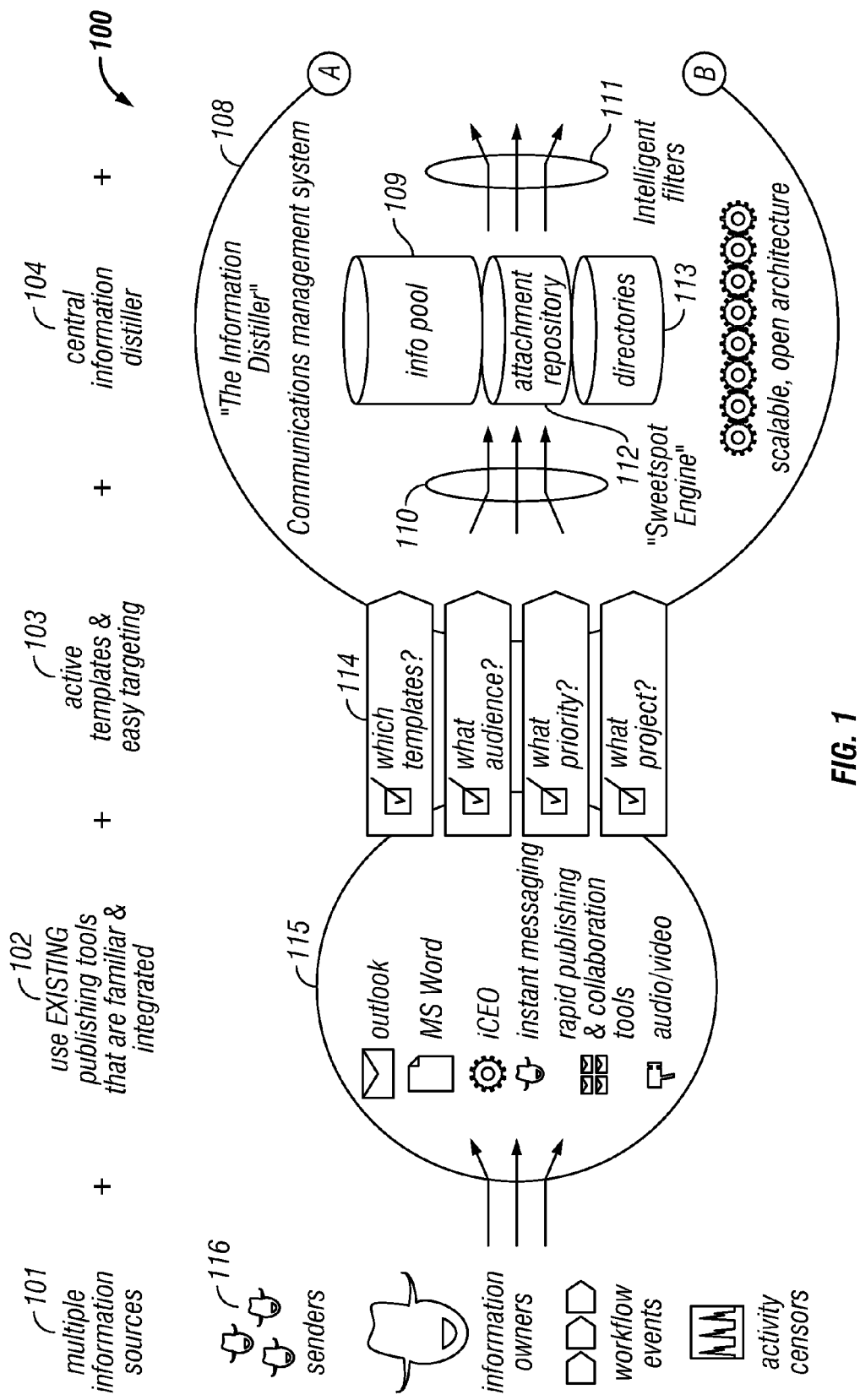
FIG. 1 provides a diagram of an application architecture in a system for automated coordination and organization of electronic communications in enterprises.
Figure 1:
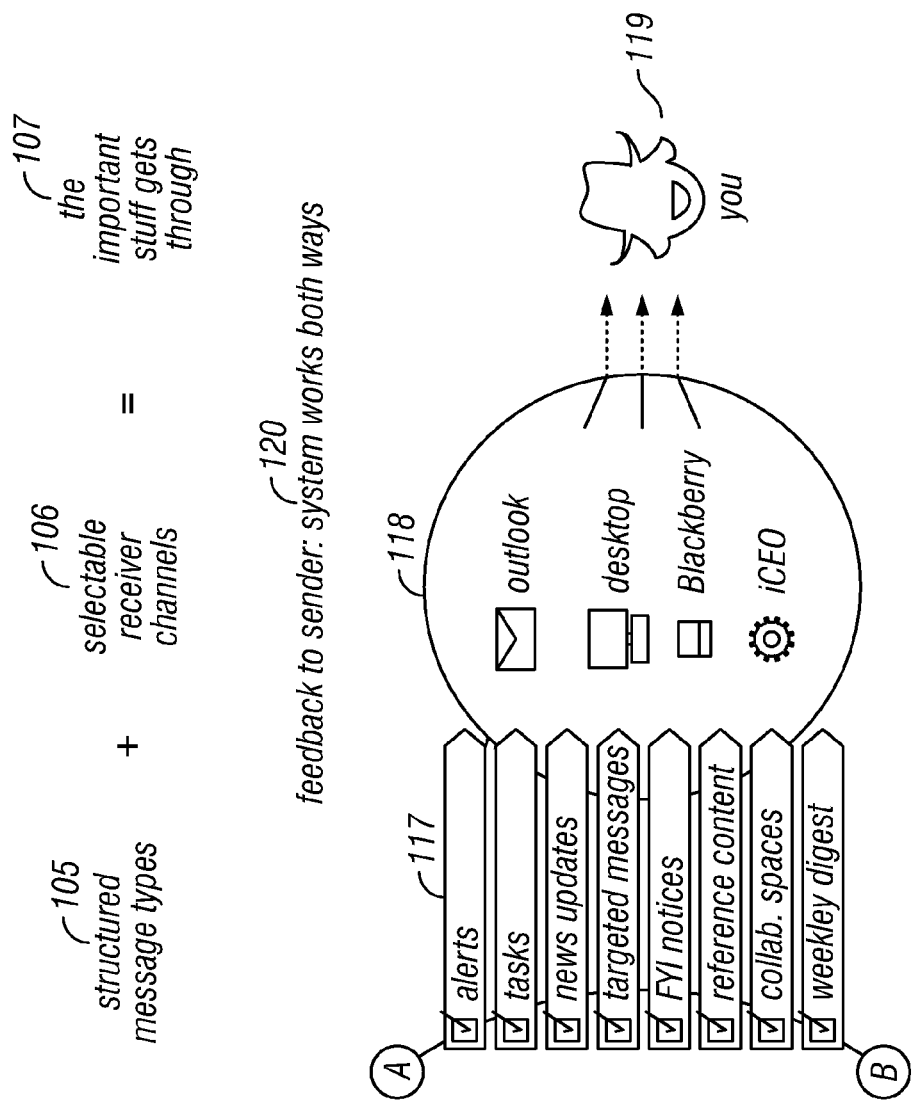

A method and system for automated coordination and organization of electronic communications in enterprises optimizes a communications network, intelligently streamlining communications and enabling workflow within enterprise applications. The system allows a user to use whatever authoring tool the user is already familiar with, such as email or word-processing, to immediately publish that communication, making use of re-usable content and templates and then automatically routing that information via the best channel to the intended recipient. The recipient is able to direct the format and mode of the incoming communications as well, based on sender, role, type, and action requirement. The underlying engine for streamlining communications dynamically injects underlying metadata so that emails are easier to manage and automate. Finally, the system collects information about the overall system in order to improve communication flow.

The arrangement described herein recognizes the importance of facilitating communication among collaborating work team members, and provides a novel way of using information technology in support of work and communication processes, using an integrated communications flow and workflow that models both established and ad hoc business processes, using an integrated process model and communications management logic that allows an enterprise to improve communications flow and workflow that models both established and ad hoc business processes, by intelligently streaming electronic communication and enabling workflow within enterprise applications that are not optimized for such capabilities, and then automatically routing that information via the best channel to the intended recipient. By means of an underlying software engine, the recipient is enabled to direct the format and mode of incoming communications as well, based on sender and message attributes (role, type and action requirement). The engine injects underlying metadata and communications flow information so that emails and electronic content assets are easier to manage and automate. Finally, the engine collects information about the overall system, in order to improve the flow of communication.

Such capabilities are delivered by non-destructively converting basic email, word-processing, spreadsheet, calendaring and contact management applications to be able to interact with an application server, which processes enhanced application requests on the application server and transmits responses from the application server back to the end user application and other applications belonging to a multiplicity of users. The underlying application server contains and utilizes a set of configurable rules that automatically invoke actions when certain data attributes satisfy certain conditions. A number of actions may be invoked, for example:

routing a message to a specific mail queue;
routing a document or request to edit a document by a certain time frame
infer and attach metadata about a communication;
automatically manage document-level security checks or processes; and
automatic subscriptions based on information accessed and read previously.

Figure 2:
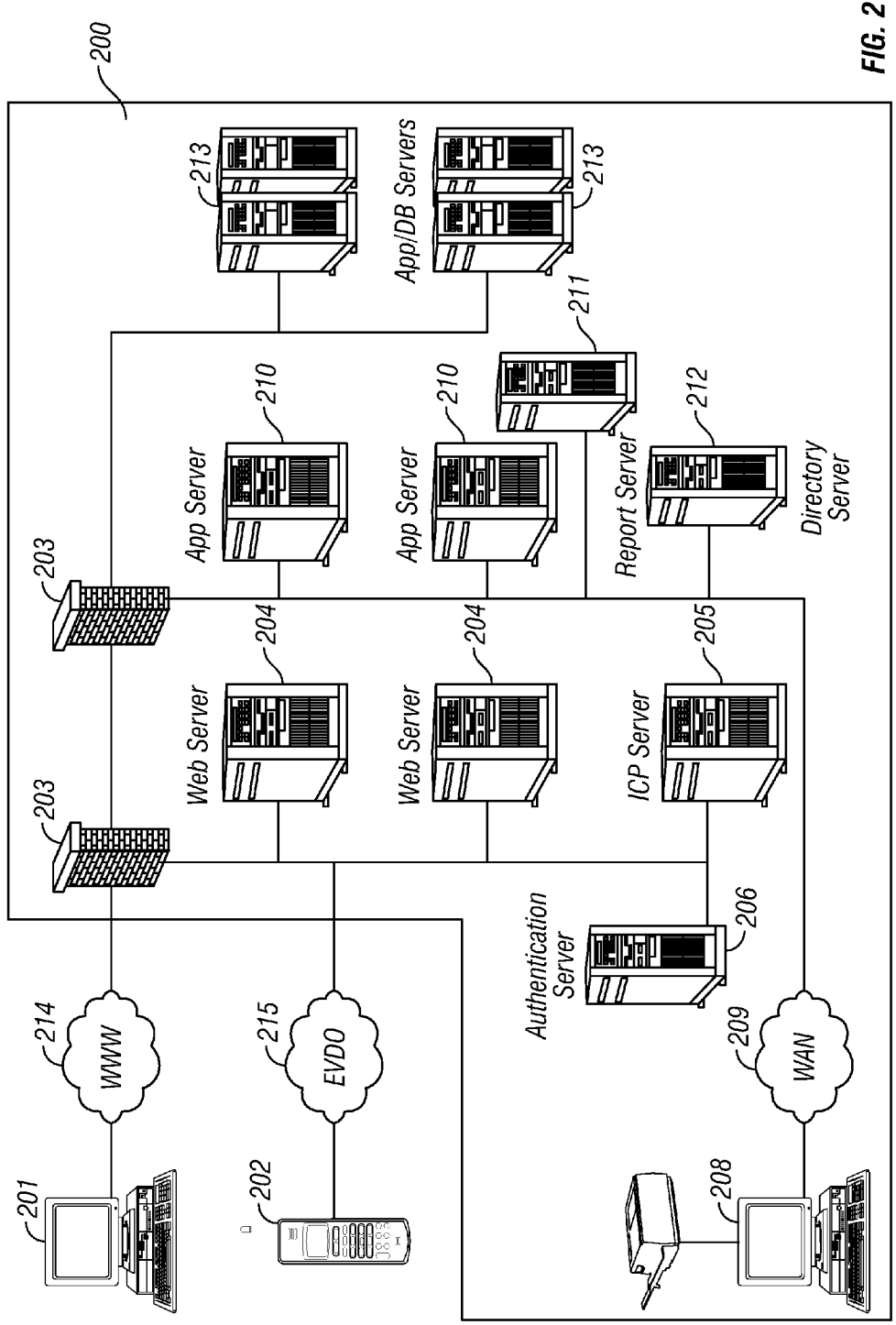
FIG. 2 provides a network architecture diagram from the system of FIG. 1.

Referring now to the Figures, FIG. 1 provides a diagram of application architecture 100 from a system for automated coordination and organization of electronic communications in enterprises. As will be seen, the system comprises a hardware infrastructure, an example of which is shown in FIG. 2, upon which a plurality of interrelated software services are implemented that support easier generation, dynamic reconfiguration and personalized reception preferences for content and communications. It is these interrelated and connected software services that are represented in FIG. 1.

In a general sense, the system enables users, using existing publishing tools 102 that they are familiar with, to publish information 101 from multiple sources. Such publishing can be rapidly accomplished due to the ease of use of active templates and easy targeting 103 of the information. A central information information distiller 104 leverages data about communications flows to specify and direct optimal delivery modes and information based on interaction of sender and receiver preferences and urgency, message classification and usage patterns. A receiver can select one or more forms in which she wishes to receive content and communications from among a plurality of structured message types 105. Additionally, the receiver can select one or more channels 106 through which he wishes to receive information. The end result of this process is that the right information gets to the right people at the right time—"the important stuff gets through..." 108. In one embodiment, the system is deployed within an enterprise and within business teams. Additionally, in one or more general-use embodiments, the system is deployed across a publicly-accessible data network to a diverse population of users.

In a typical enterprise, information, typically content, such as documents, and communications, such as messages of various sorts, originate from a variety of sources 116. The information, for example, may originate with a publisher or a content creator 401 or another individual. In addition, the typical enterprise user receives information from a variety of other data sources and inputs 405, including those within the enterprise and from a variety of third party sources. The present system allows the senders or publishers of such information to publish the information rapidly using publishing tools 115 that the senders or publishers are already familiar with and that they use all the time. For example, in enterprise environments, it is exceedingly common for users to users to work with an integrated suite of office software applications, such as OFFICE (MICROSOFT CORPORATION, Redmond, Wash.), that provides software tools such as an email client, a calendaring application, a word processor and a spreadsheet. There are other such applications which are in broad use and are very familiar to a large number of users, such as instant messaging clients. The present system accomplishes its goal of coordination and organization of electronic communications within the enterprise without imposing a new set of software tools on users within the enterprise, allowing them to continue using the software tools that they are familiar with. In addition to office suites, such publishing and communication tools 420 may include:

portals;
blogs;
forums;
wikis;
audio and/or video tools;
an image library;
workflow; and
business sensors.

In addition to using familiar tools to publish, the system also incorporates the ability to create dynamic templates 114 for rapid publishing, wherein such templates allow the user diverse format choices 418 that can be reused and shared. The dynamic templates actively interpret the content being created to generate specialized templates that guide in the development of that content along best practice lines. The system extends and leverages existing automation software and technologies. For example, products such as MICROSOFT OFFICE, OUTLOOK, and smart cellular phone devices are able to provide basic text editing and formatting capabilities, but they do not transparently allow the creation of templates to assist in the editing process. The system extends the function of the basic editing system to dynamically interpret and generate templates based on purpose and it captures revisions of templates on a dynamic basis for automated self-improvement. The system drives the automation and storage of key metadata to help users manage their communications. It also provides adaptive tuning for such capabilities based on information collected in real time during operation. More will be said about the intelligent templates herein below.

An additional feature of the system that assists in publishing and content generation is the ability for the user to create intelligent broadcasts and dynamic distribution lists targeted to the desired audience 417 and tagged with a priority. In order to make use of such broadcasts and distribution lists, the user need only select the name of a broadcast or distribution list from a menu or define the target audience by selecting from a pick list of group descriptors or building his or her own dynamic list to suit a particular communications message. The system extends and leverages the methods by which current office automation software and technologies and address of direct communications to recipients. Current technologies such as MICROSOFT OUTLOOK and smart cellular phone devices are able to provide message delivery by means of an address database or group distribution list. The system extends this functionality to dynamic distribution lists which allow addressing beyond identity, based on attributes such as role, interest, business group, locations, buildings, project teams, customer groups—both stated and inferred, location, timing and scheduling. Additionally, it is possible to estimate the possibility of a message being read and to determine the best way of sending a communication, for example, whether by email or by RSS feed. The recipient is able to override such setting if they desire to be alerted about such communications in a different manner. Accordingly, the system integrates email with publish/subscribe functionality into one simple system, with receipt rules based on mutual preferences set by sender and receiver. As a result, mass emails can be replaced with targeted news updates, weekly digests and other relevant messaging. The sender can additionally receive predictions and feedback regarding the performance of the communication in terms of the message being read. Additional features supporting rapid publishing include;
- timed-release messaging, wherein the published specifies a time and date for release of a particular communication or document, for example;
- integration of audio, video and other digital communications types;
- a feed library helps users access all information available within the enterprise, provide feedback to the producers, and exchange feed preferences with other users;
- display of content in layers that publishers can easily reuse and re-version and which allow users to consume what they need, disregarding what they do not. An example of layered content display is the organization of content into tabbed layers in a single document. Additionally, content layering can involve the use of various versions for purposes of displaying, rendering or modifying content.

One or more intelligent content filters 111, 414 allow the receiver to manage the inflow of communications by specifying parameters for automatic screening of messages and content. The system creates a secure and validated environment for allowing recipients to determine how they wish to receive communications—whether by email or wireless or on a portal page; whether in individual or digest format, whether immediately or grouped in a periodic fashion, whether addressed to their identify or role. Additionally recipient and senders can advertise their preferences for types of messages based on content, subject and timing.

Using intelligent filtering, the receiver 119, 403 is enabled to specify how or if messages and content are to be received 412. Thus, for example, the receiver is enabled to:
- opt-in or opt-out of a particular message type or content from a particular content owner, for example;
- subscribe to a particular blog or wiki, for example or to receive a particular report on a regular basis;
- configure receipt preferences;
- publish content themselves; and
- respond to messages and content.

This information about how messages are to be received forms the basis for a participation map and find me/follow me capability. In configuring the intelligent filters 111, 414, the receiver can specify the channel or channels 410 through which they wish to receive messages and content and specify message type and content type 409. The various message types and content types 117, 413 may include, for example:
- alerts;
- tasks;
- news updates;
- targeted messages;
- FYI notices;
- reference content;
- collaborative spaces, such as forums and wikis; and
- periodic digest, for example, weekly.

As with content publishers, a receiver may specify any of a number of clients 118, 411 through which they receive content and messages, for example
- OUTLOOK;
- other desktop client applications;
- BLACKBERRY or smartphone;
- or via an enterprise portal.

As shown, the system is bidirectional, wherein users can be both senders and receivers. Thus, a feedback channel 120, 402 allows a receiver to send out content and messages. The receiver may send out in response to content or messages received, or he or she may be the initiator.

While the system has been described in terms of an enterprise, even within an enterprise setting, the participation map may be expanded to include users outside of, but associated with the enterprise, such as customers 404 of the enterprise.

At the heart of the system is a central engine 108. The central engine itself is composed of one or more of a series of components, including:
- an information pool 109;
- an attachment repository 112, 307;
- one or more directories 113; and
- people and distribution attributes to direct messages.

In one embodiment, the information pool 109 constitutes a central messaging system and content pool 416. The central messaging system and content pool 416 may include one or more of the following functional features:
- urgency- and transaction-based distribution and routing;
- individual appropriate distribution and routing;
- enables workflow through messaging;
- a scalable, open, extensible platform; and
- reusable assets, for example layered content and reusable templates.

A central engine 108 specifies optimal delivery modes and information based on interaction of sender and receiver preferences and urgency and message classification and prior and current usage patterns. The central engine 108 analyzes transcripts and logs of all messaging and content generation in order to find optimal communication patterns, provide comprehensive understanding and to track the effectiveness of the system. The key is that the central engine 108 utilizes context-dependent delivery mode retargeting capabilities, such as:

- the ability to specify alternate delivery modes based on interaction of sender and receiver message context, preferences and urgency; and
- the ability to remember values of preconditions and settings and use them to determine the course of future communications.

Transcript and logs are generated on a reports server, as described below, that contain everything that was communicated by the user, plus markers for significant events or actions. These user interaction transcripts are stored and analyzed by means of a log analysis and future distribution planning tool. When a particularly effective communication pattern is identified, the system may record it in a collective preferences database, recording the best way to send or receive a communication, also known as the "sweet spot." Analyzing the log data gives a detailed, comprehensive understanding of users and reveals role-based similarities after which optimal delivery routes can be patterned in a clear, easy-to-use and secure manner. Various embodiments provide one or more alternative methods of analyzing transcript and log data:

- annealing algorithms are used to enable collaborative filtering and seek birds-of-a-feather similarities;
- densely connected directed bipartite sub-graphs over "communication vectors" may reveal ad hoc communities of interest that can be converted to relationship teams. The "hubs" are directory nodes on a particular topic; the sink nodes are "authorities;"
- partition of the communication space using eigenvectors leading to an algorithm that provides insight into clusters of interest topics, for example "compliance" and "lending to oil companies."
- interpreting and using key metadata to help users manage their communications and providing adaptive tuning for such capabilities based on information collected in real time during operation.

The system integrates adaptive tuning of all included capabilities based on information collected in real time during operation. This spans from security oversight to compliance management to improvements in template design to advancing the central engine 108, to improving the dynamic distribution list. Additionally, the system allows low-level calendaring and task management to be automatically reported to a comprehensive database for enterprise-wide analysis of resource allocation/constraints.

The document attachment repository 112, 407 provides automated attachment management, wherein client applications automatically extract attachments to the repository, replacing the extracted attachment in the message with a link to the copy of the attachment in the repository, thereby reducing load on messaging servers and the network and making more efficient use of messaging quotas. Additionally, one embodiment provides automated digital rights management for stored attachments.

As above, the central engine further includes one or more directories 113. In one embodiment, the directory 113 contains secure user profiles. In one embodiment, the system uses the directory to generate base community data and to assign user profiles to communities.

FIG. 2 shows a network architecture diagram from a system for automated coordination and organization of electronic communications in enterprises. As previously described, in one aspect, the system constitutes a plurality of interrelated software services that support easier generation, dynamic reconfiguration and personalized reception preferences for content and communications across one or more enterprises. FIG. 2 provides a diagram of the network architecture upon which these software services are implemented and distributed. In one embodiment, the network infrastructure 200 may include one or more of the following components:

- One or more client devices 201, 202, and 208;
- a network across which the client device access the system 209, 214 and 215;
- an authentication server 206;
- one or more firewalls 203;
- one or more web servers 204;
- an intelligent communications platform (ICP) server 205;
- one or more application servers 210;
- a report server 211;
- a directory server 212; and
- one or more application/database servers 213.

As described above, the system provides publishers and content owners a plurality of modalities for messaging and content delivery. Previously described was the variety of software tools that are compatible with the system. Additionally, a large number of client device types are compatible with the system. As shown in FIG. 2, a client may be a conventional data-processing device, 201 and 208, such as a networked desktop computer or a laptop computer, or it may be a wireless client such as wireless phone or a wireless handheld device, a BLACKBERRY (RESEARCH IN MOTION, Waterloo, Ontario, Canada), for example. Networked clients may communicate with the system via a WAN (wide area network) 209 or a LAN (local area network). Additionally, clients may communicate with the system via a public communications link, such as the World-Wide Web 214. Wireless clients may communicate via a wireless network such as an EVDO (evolution data-optimized) network 215.

Typically, those accessing the system via a publicly-accessible network will access the system across one or more firewalls 203. Additionally, one accessing the system via WAN or LAN 208 will also access application services provided by the system across a firewall.

An authentication server 206 provides authentication services to users accessing the system. One skilled in the art will readily appreciate that authentication serves as the basis for determining whether a privilege is granted to a particular user or process, keeping information from becoming known to unauthorized users and non-repudiation.

One or more application servers 210 house the business logic for the application services provided by the system. One or more web servers 204 accept HTTP requests (hypertext transfer protocol) directed to the application servers. Additionally, the network infrastructure may include one or more database servers 213 to provide database services to the rest of the system The practitioner of ordinary skill will appreciate that the infrastructure depicted in FIG. 2 constitutes a three-tier application consisting of web server 204, application server 210 and database server 213.

In one embodiment, the client supports a user interface through which the user accesses and interacts with the various system features and functionalities. For clients 201 and 202, accessing the system over publicly-accessible networks, the user interface may be a browser-based user interface.

The web server 204 may provide one or more different ways to forward a request to an application server and to return a page to the user. These approaches may include any of the Common Gateway Interface (CGI), Microsoft's Active Server Page, and Java Server Page.

A report server 211 provides reporting services to system administrators. Additionally, the report server maintains the log files with which the ICP server optimizes routes for delivery of content and messages, as described herein below.

Figure 3:
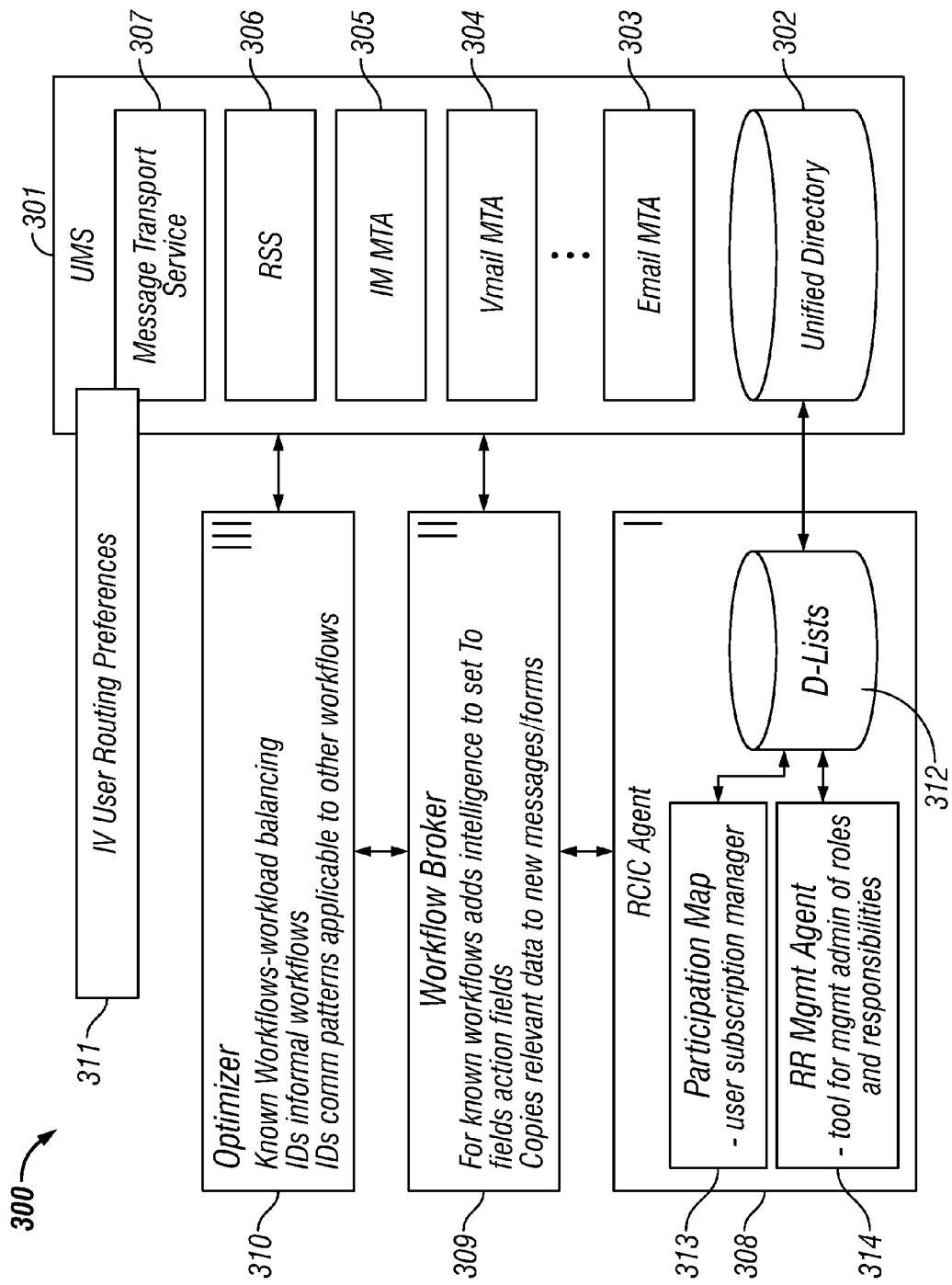
FIG. 3 provides a diagram of a universal messaging system from the system of FIG. 1.
Figure 4:
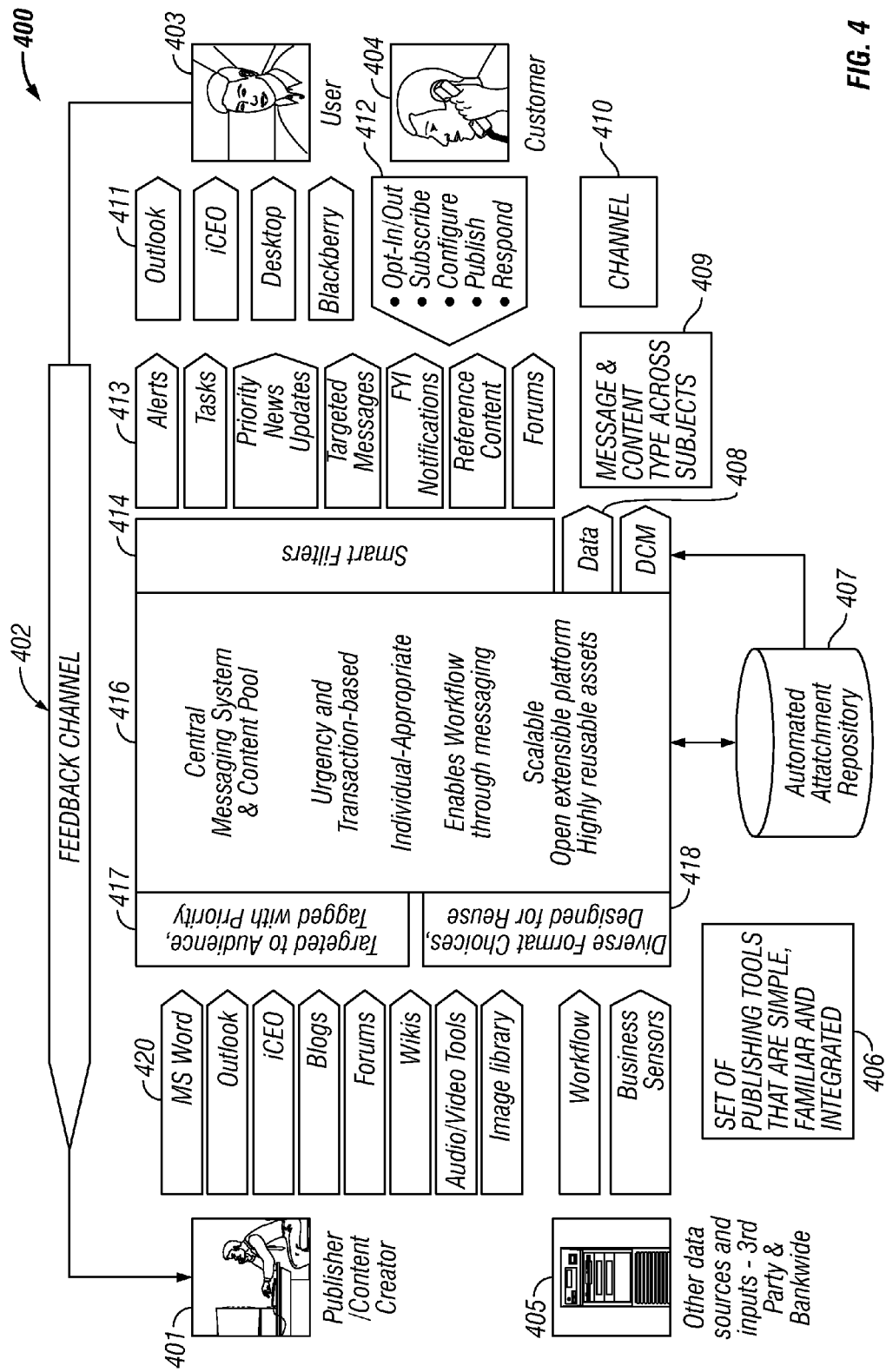
FIG. 4 provides a functional architecture diagram from the system of FIG. 1.

FIG. 3 provides a detailed diagram of a central messaging system 300 as described above. The central messaging system creates a secure and validated environment for extensions in the form of signed plug-ins, either originating from within the enterprise or provided by authenticated third-parties. This environment allows the application services to safely interoperate, and allows business rules to be injected into the underlying applications to take advantage of their inherent capabilities in a clear and cohesive manner, so that the applications interoperate with enterprise business systems and data in a transparent and secure manner. A universal messaging system 301 may include one or more of the following components:

- a message transport service 307;
- a unified directory 302; and
- one or more intelligent message transfer agents. As shown in FIG. 3 an exemplary embodiment of the messaging system may include:
  - an email MTA (message transport agent) 303;
  - a vmail (voicemail) MTA 303;
  - an IM (instant messaging) MTA 305; and
  - a secure RSS service 306.

The MTS 307 provides the mechanism for the transfer of messages between agents. The agents involved may be local to the enterprise or may be located within a related enterprise.

Additionally, the messaging system may include what can be described as an RCIC (aware of role, customer, interest, content-based) agent 308 for addressing messages. Within the RCIC agent may reside a participation map 313, which is responsible for management of user subscriptions to various content- and message-types. Additionally, within the RCIC agent 308 may be found a RR (roles and responsibilities) management agent 314 which enables addressing of a message by role or responsibility. By means of the RCIC agent, dynamic distribution lists (DDLs or D-lists) 312 can be generated using user profile information drawn from the unified directory 302 and business rules, based on criteria specified by roles and responsibilities and the participation map.

A workflow broker 309, for known workflows, adds intelligence to set 'to:' fields by including action requirement fields. Additionally, the workflow broker copies relevant data to new messages and/or forms.

An optimizer 310 performs workload balancing for known workflows. Additionally, through analysis of log files provided by the reports server, the optimizer identifies informal workflows and communication patterns applicable to other workflows. Inputs provided by each of the foregoing elements, labeled I-III in FIG. 3, plus input based on user routing preferences IV provide the addressing and routing information that allows the intelligent transport of messages across the enterprise by the message transport service 307.

Figure 5:
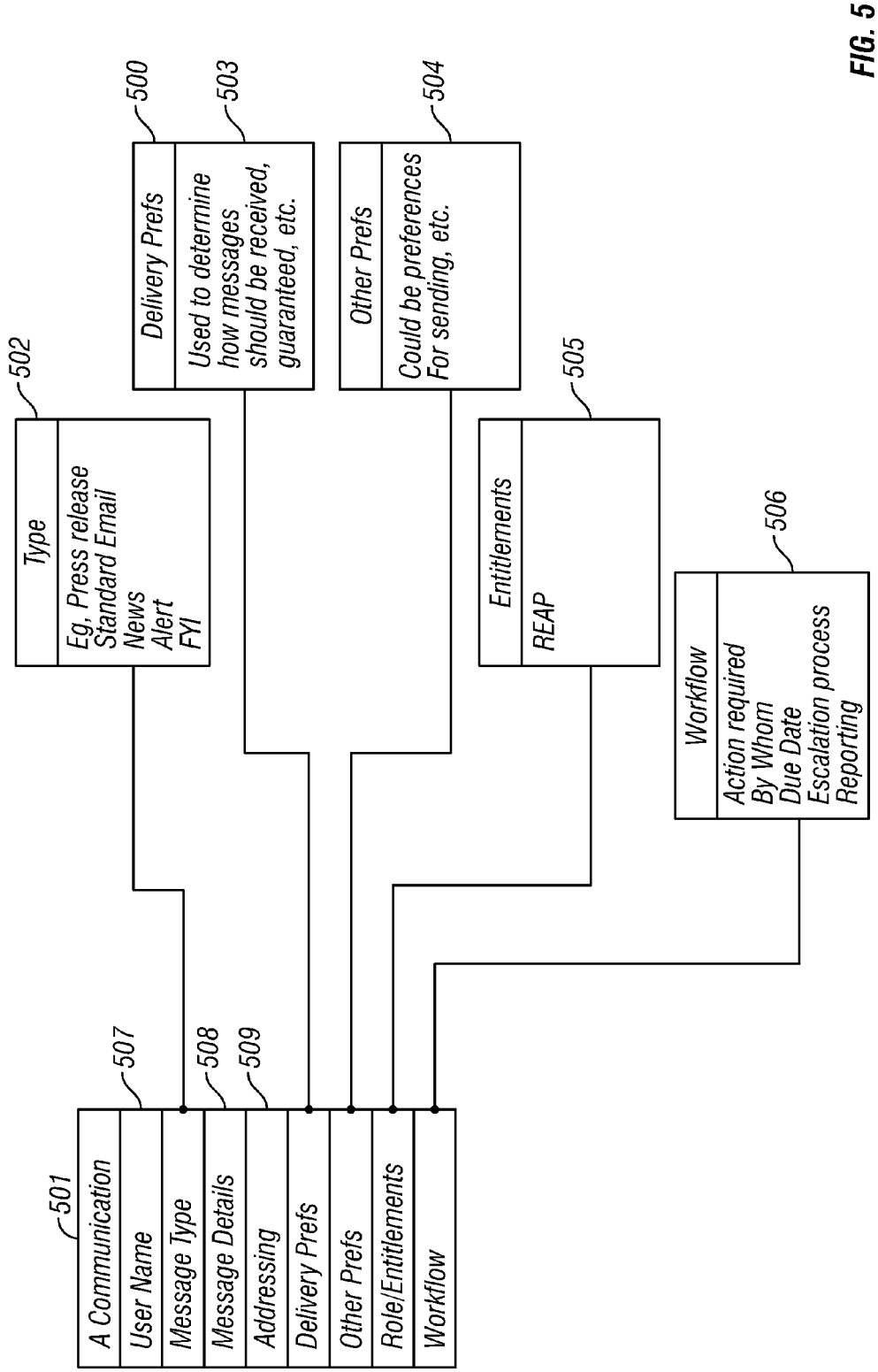
FIG. 5 provides a diagram of an object model for a message from the system of FIG. 1.

As described herein, the system provides an extensive capability to embed metadata into a communication. A publisher or sender may formulate business rules relevant to the message and embed them, into the message. These business rules may relate to sending and delivery preferences and to workflow. The system may evaluate a message's embedded metadata, taking into account sender preferences and recipient preferences, in order to determine the optimal delivery route for a message. Additionally, the system itself may embed metadata into a communication. Such system-embedded metadata can greatly facilitate delivery and organization of communications within the enterprise. Referring now to FIG. 5, shown is a diagram of a message object model 500 showing a plurality of metadata fields that can be associated with a communication within the system. In one embodiment, the business rules contained in the metadata can be expressed in a markup language. For example, an XML-based business communications markup language could be used to specify the business rules. In the example of FIG. 5, a communication 501 may have a variety of associated metadata fields, among them, for example:

- user information/attributes;
- message type 502;
- delivery preferences 503;
- other preferences 504;
- entitlements 505; and
- workflow 506.

Additionally, the communication will include, for example, a user name 507, a message body providing message details 508, and addressing 509. The foregoing message object model is exemplary only and is not intended to limit the invention.

Figure 6:
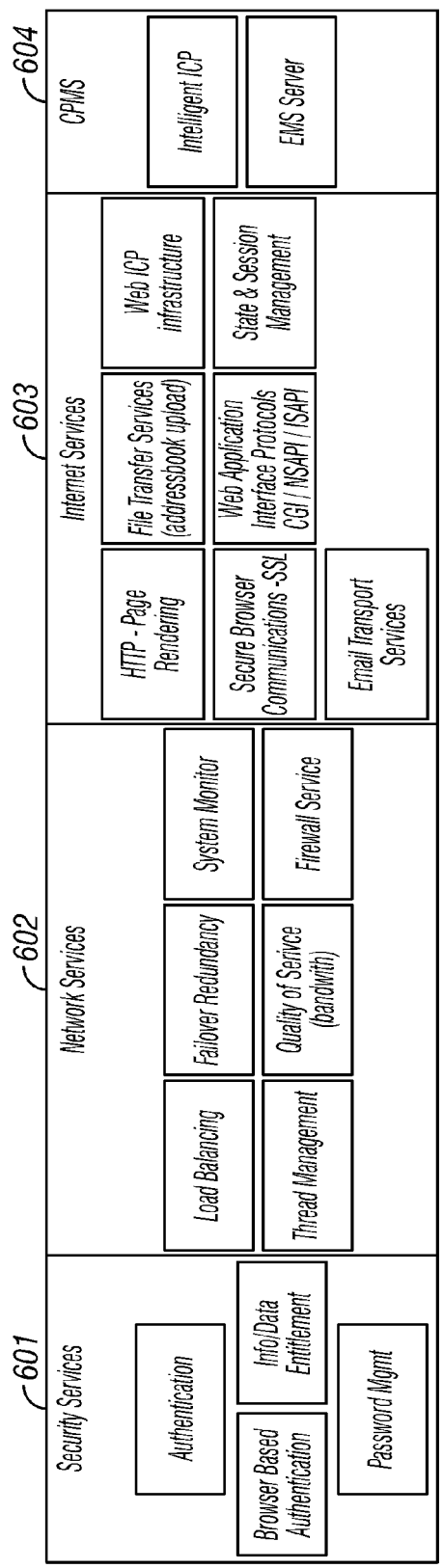
FIG. 6 provides a diagram of an application service model from the system of FIG. 1.
Figure 6:
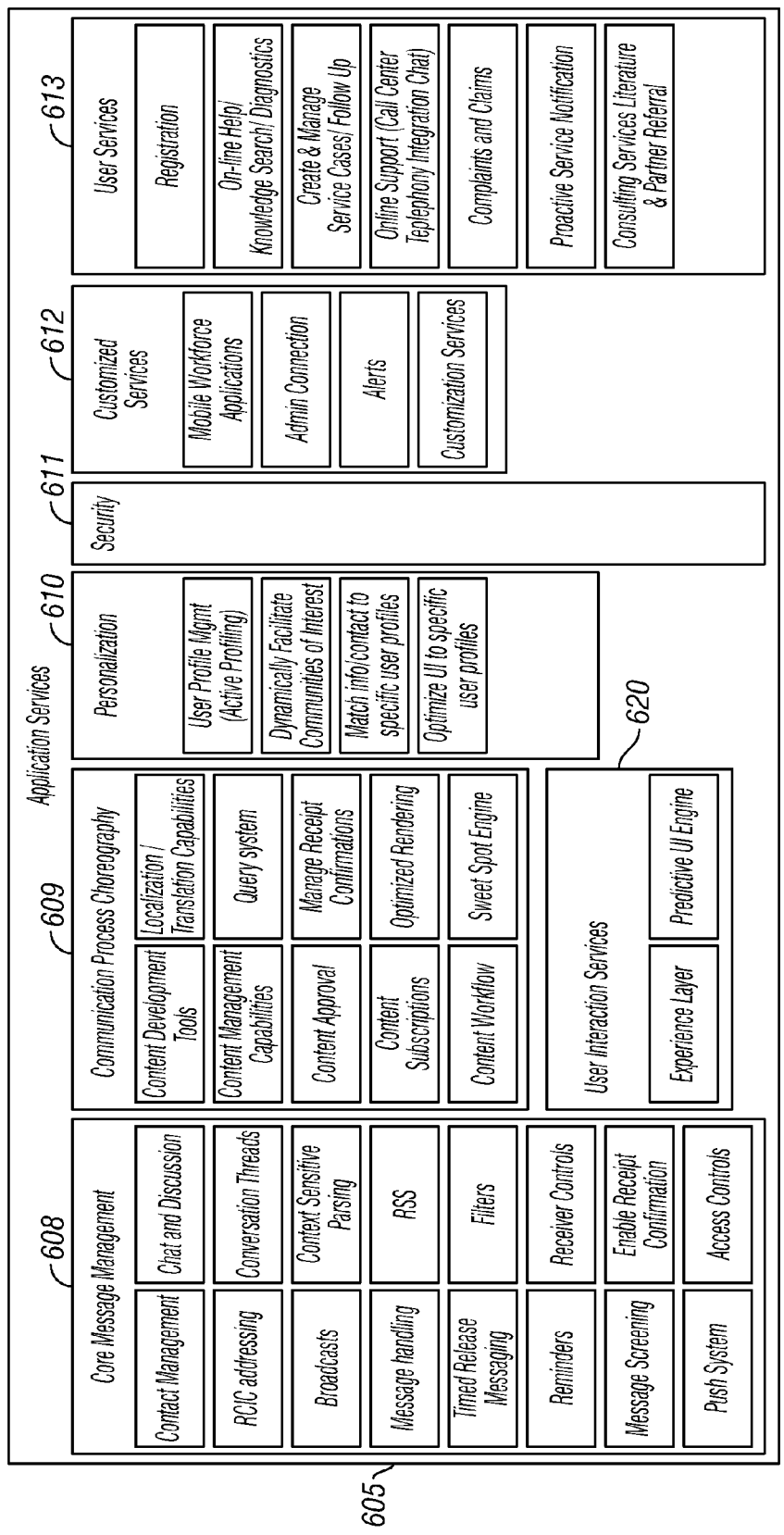
Figure 6:
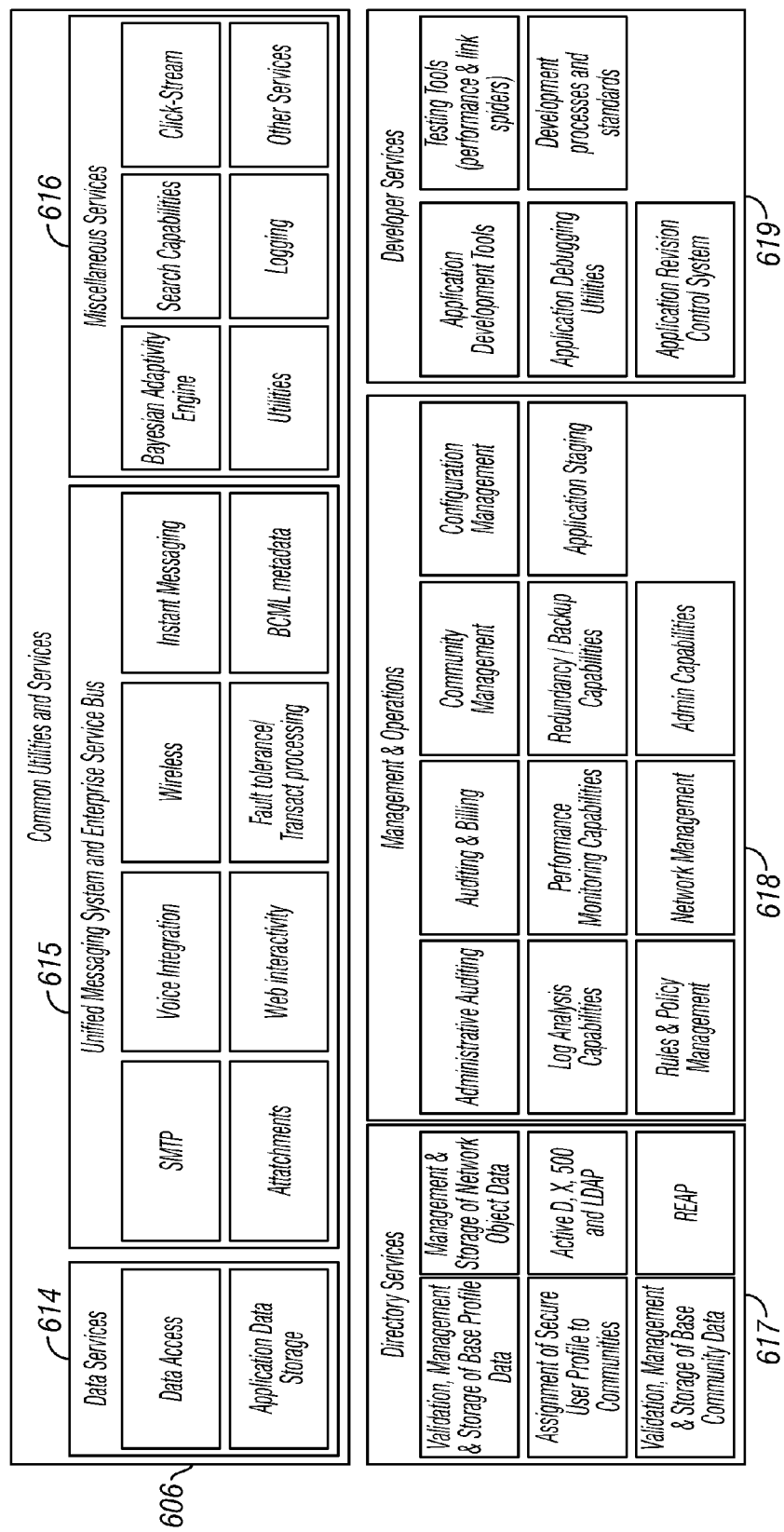

FIG. 6 shows a diagram of a communication process services management application services model 600. Top level service categories may include any of the following:

- security services 601;
- network services 602;
- Internet services 603;
- CPMS (communications process management services) 604;
- application services 605;
- common utilities and services 606;
- directory services 617;
- management and operation 618; and
- developer services 619.

Within security services 601 may be included components for any of:

- authentication;
- browser-based authentication;
- information/data entitlement; and
- password management.

Within network service 602 may be provided components for any of:

- load balancing;
- fallover redundancy;
- system monitor;
- thread management;
- quality of service, including bandwidth management; and
- firewall service.

Within Internet services 603 may be provided components for any of:

- http-page rendering;
- Within network service 602 may be provided components for any of file transfer services for address book upload
- web ICP (intelligent communications platform) infrastructure;
- secure browser communications—SSL (secure sockets layer);
- web application interface protocols—CGI/NSAPI/ISAPI (common gateway interface/NETSCAPE server API (application program interface)/Internet server API);
- state and session management; and
- email transport services.

Within CPMS 604 may be provided components for any of:
ICP (intelligent communication platform); and
EMS (enhanced messaging service) server.

Within application services 605, there may exist one or more of the following mid-level service categories:

core message management 608;
communications process choreograph 609;
personalization 610;
security 611;
customized services 612;
user services 613; and
user interaction services 620.

Within core message management 608 may be provided components for any of:
- contact management;
- chat and discussion;
- RCIC addressing;
- conversation threads;
- broadcasts;
- context sensitive parsing;
- message handling;
- RSS (really simple syndication);
- timed-release messaging;
- reminders;
- receiver controls;
- message screening;
- enable receipt confirmation;
- push system; and
- access controls.

Within communications process choreography 609 may be provided components for any of:
- content development tools;
- localization/translation;
- content management;
- query system;
- content approval;
- manage receipt confirmations;
- content subscriptions;
- optimized rendering
- content workflow; and
- sweet spot (optimization) engine.

Within personalization 610 may be provided components for any of:
- user profile management (active profiling);
- dynamically facilitate communities of interest;
- match information or content to specific user profiles;
- optimize user interface (UI) to specific user profiles; and.
- connecting customer relationship teams around our customers served.

Within user interaction services 620 may be provided components for any of:
- experience layer; and
- predictive UI engine.

Security services 611 extend and leverage the methods by which current office automation software and technologies provide security for messages between senders and recipients. For example, products such as MICROSOFT OFFICE, OUTLOOK and smart cellular phone devices are able to provide basic security services via encryption, certificates and identity management. The arrangement described herein creates an open metric by which multiple security services and content rights management systems interoperate. Such a metric can be based on a customized formula by the enterprise that convolves the large number of authentication credentials provided in order to generalize an overall probability of authentication. The system can thus enable open and multi-enterprise deployment between trading partners, for example. Such an environment provides an additional layer of security on top of those provided by the network of applications on which the system operates. This environment can be extended from the base enterprise to its trading partners. This system drives the automatic generation and storage of secured key metadata to help users manage their communication and provides adaptive tuning for such capabilities based on information collected in real time during operation.

Within customized services 612 may be provided components for any of:
- mobile workforce applications;
- administrative connection;
- alerts; and
- customization services.

Within user services 613 may be provided components for any of:
- registration;
- online help/knowledge search/diagnostics;
- create and manage service cases/follow-up;
- online support, for example call center telephony integration or chat;
- complaints and claims;
- proactive service notification; and
- consulting services, literature and partner referral.

Within common utilities and services 606, there may exist one or more of the following mid-level service categories:
- data services 614;
- unified messaging system and enterprise service bus 615; and
- miscellaneous services 616.

Within data services 614 may be provided components for any of:
- data access; and
- application data storage.

Within unified messaging system and enterprise service bus 615 may be provided components for any of:
- SMTP (simple mail transfer protocol;
- voice integration;
- wireless;
- instant messaging;
- attachments;
- web interactivity;
- fault tolerance/transaction processing; and
- BCML (business communications markup language) metadata.

Within miscellaneous services 616 may be provided components for any of:
- Bayesian adaptivity engine;
- search capabilities;
- click-stream;
- utilities;
- logging; and
- other services.

Within directory services 617 may be provided components for any of:
- validation, management and storage of base profile data;
- management and storage of network object data;
- assignment of secure user profiles to communities; and
- Active D (active directory), X.500 and LDAP (lightweight directory access protocol).

Within management and operation 618 may be provided components for any of:
- administrative auditing;
- auditing and billing;
- community management;
- configuration management;
- log analysis capabilities;
- performance monitoring capabilities;
- redundancy/backup capabilities;
- application staging;
- rules and policy management;

network management;
administrative capabilities.

Within developer services 619 may be provided components for any of:

Application development tools
testing tools, for example for testing performance and link spiders;
application debugging utilities;
development processes and standards; and
application revision control.

Application Services 605

Provided below is more detailed listing of the functions provided within the functional category of application services 605:

Management and Operations
  administrative auditing;
    Provides ability to track frequency of usage for specific functions on site (e.g. wait time for login, etc.);
    Provides ability to track frequency of usage by specific users;
    Provides ability to track custom metrics;
  Log Analysis Capabilities
    Extracts and analyzes data from log files and other sources;
    Generates predefined and ad-hoc reports based upon log and data analysis; message and communications trends and forecast performance based upon analysis;
    Provides advanced data analysis and report programming tools;
  Rules & Policy Management
    Manages rules for common capabilities such as advertisements and promotions;
    Manages policies for operations such as authorization and access control for user groups and content;
    Logs policy changes;
  Auditing and Billing
    Provides ability to track usage of site to specific users and bill for that usage;
  Performance Monitoring Capabilities
    Monitors production site performance and traffic;
    Provides automatic alarm for performance thresholds;
    Generates reports based upon past performance;
  Network Management
    Centrally creates and manages policies and user profiles;
    Centrally creates hardware inventories for workstations automatically;
    Centrally configures printers;
    Offers centralized application installation;
    Assigns application rights to groups or individuals;
    Creates standard desktop environment for some or all users;
    Offers load balancing;
    Offers automatic transparent transfer across multiple servers;
    Provides remote help desk utilities for software-related problems;
  Community Management
    Defines communities of visitors based on common characteristics and preferences;
    Dynamically assigns user to community based on profile;
    Updates community attributes;
  Redundancy/Backup Capabilities
    Restores deleted application files an corrupted files/settings automatically;
    Provides component failover capabilities;
  App. Admin Capabilities
    Provides administrative capabilities; and
    Provides application administration tools (for example, restart application).

As previously described, the intelligent communications platform provides a set of software services that supports easier generation of content, dynamic reconfiguration and personalized reception preferences for the content and communications. The user makes use of such services by means of a user interface, as described herein below.

Figure 7:
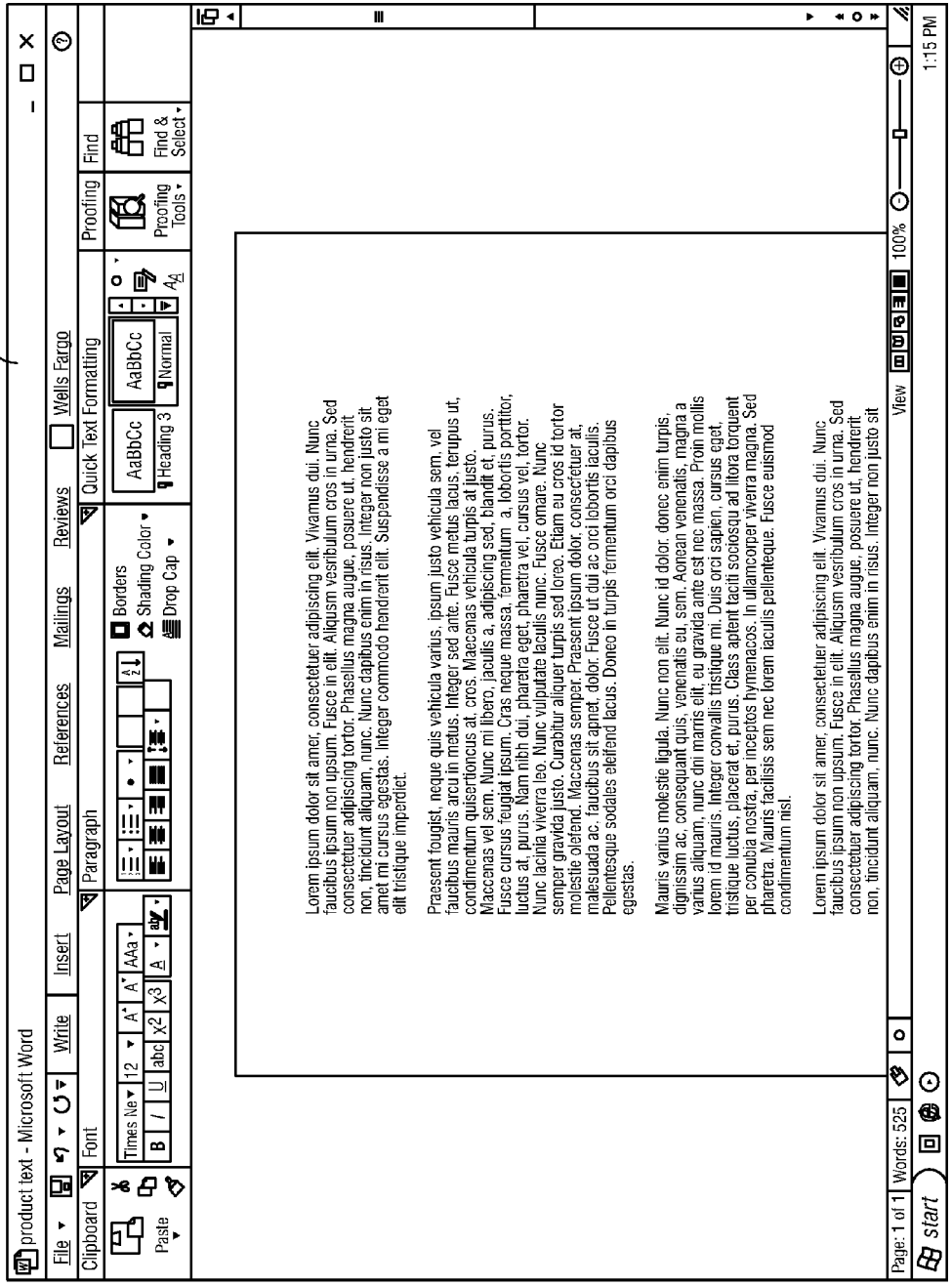
FIG. 7. provides a view of a user interface to a software application that includes an icon for gaining access to the system of FIG. 1.

FIG. 7 provides a view 700 of a user interface to a software application that includes an icon for gaining access to the system of FIG. 1. The user interface shown happens to be the UI (user interface) for a commonly-known word processing application. However, FIG. 7 is intended merely to illustrate the features and operating principles of the system and is not intended to be limiting. The system is, in fact, compatible with a large assortment of desktop applications, including, but not limited to word-processing applications, spreadsheet application, calendaring applications, messaging applications and page layout applications. As shown in FIG. 7, the application has an interactive element such as the icon 701 added to its UI. In this case, the icon 701 has been added to the toolbar; however other placements of the icon are within the scope of the invention. By activating this icon 701, the user gains access to variety of screens and UI's by which the user is able to utilize the various service and features provided by the intelligent communications system.

FIGS. 8-13 provide several views of a UI to a messaging application from the system of FIG. 1.

Figure 8:
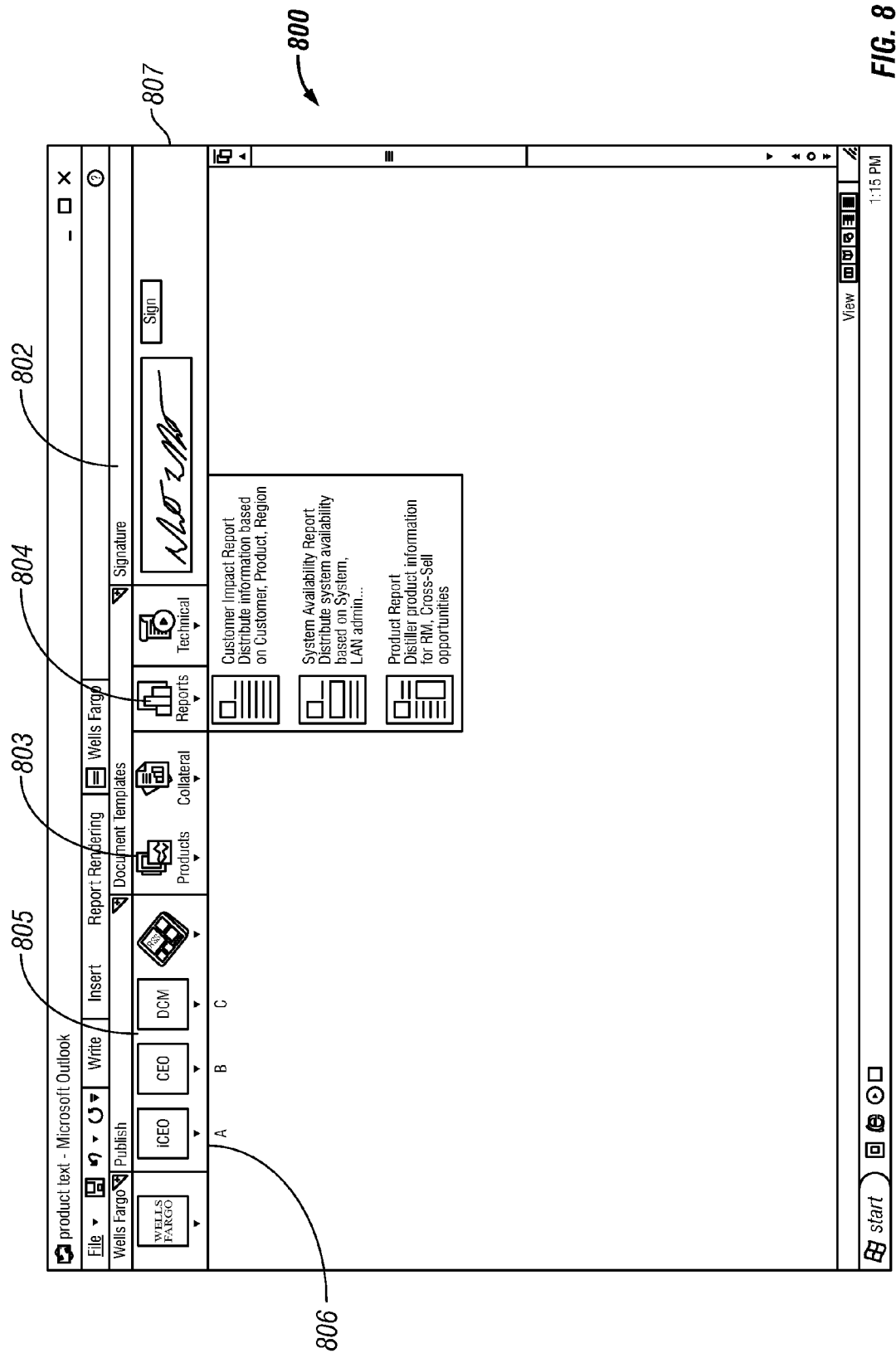

Referring now to FIG. 8, a view 800 of the UI shows a toolbar 801 providing access to a variety of services and features of the system. The toolbar 801 includes a signature field 802 containing a signature with which a user can sign content or communications with which they have interacted. The user may be, for example, the author of the document, or they may be an approving authority.

A document template section 803 of the toolbar includes a plurality of types of documents. In the example shown, template types include products, collateral, reports and technical. Here, the exemplary user has selected the icon for reports, whereupon a menu of report templates is displayed. In the example, the report templates include customer impact report, system availability report and product report. The lists of template types and report types are merely exemplary and are not intended to limit the system.

A publishing section 805 of the toolbar provides a series of elements 806a-c with which the document is published according to one or both of configurable metadata embedded within the document and one or more dynamic distribution lists, both of which will be described in greater detail herein below.

Figure 9:
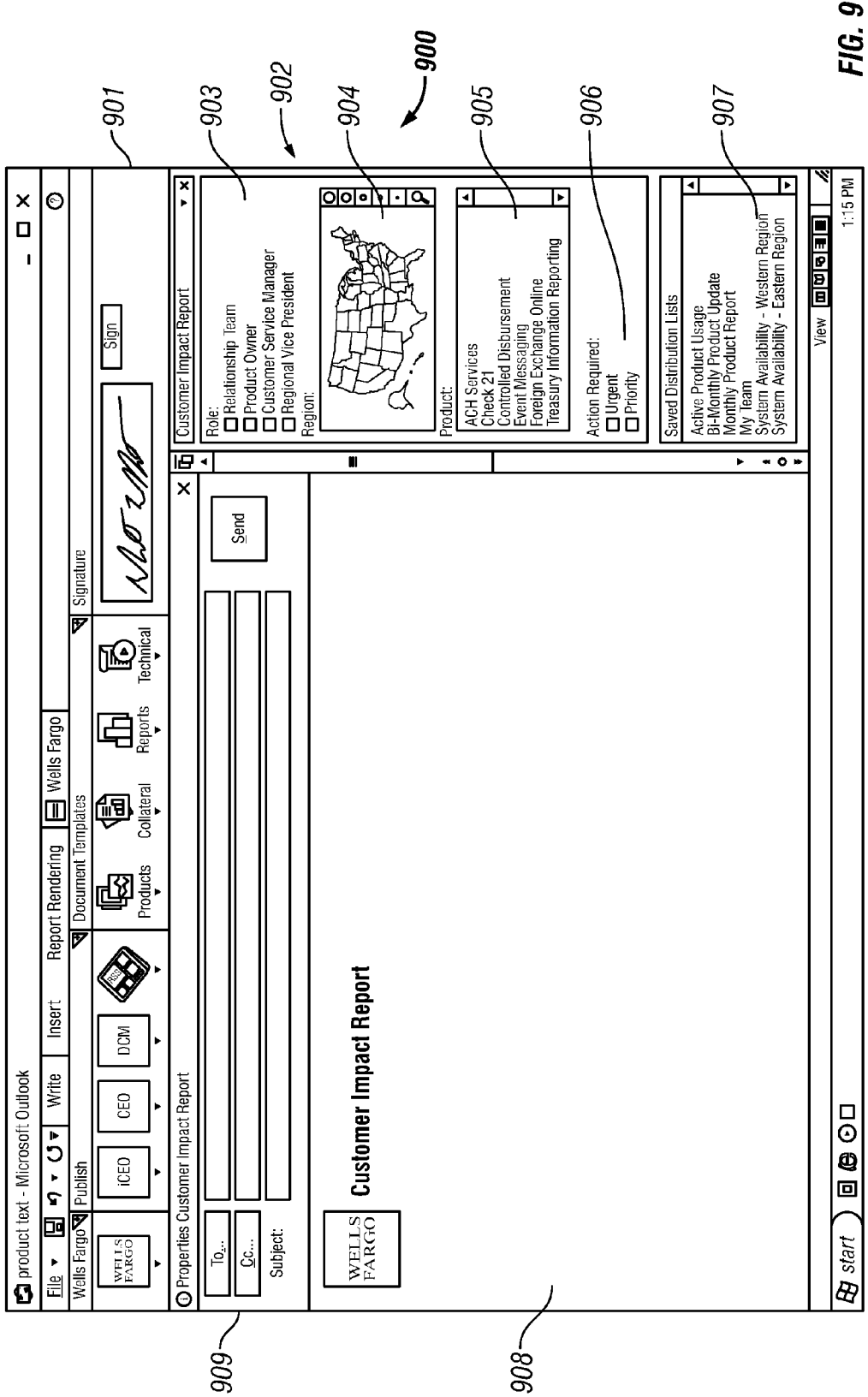

Turning now to FIG. 9, shown is a view 900 of an exemplary template. The example template shown is that of a customer impact report, which the user would have opened by selecting 'customer impact report' from the menu 804. The toolbar 901 remains visible. An address block 909 having addressing fields is provided. A message field 908 is provided upon which the user composes the report to be published. An addressing UI 902 is provided whereby the user generates a distribution list naming the parties to which the report is to be published. Instead of selecting the report recipients by name, the distribution list is generated by specifying the attributes of the target audience for the report. As shown herein, the addressing UI includes sections for identifying the recipient's role 903, the recipients region 904, the product the report relates to 905 and the report priority 906 if action is required. The addressing UI also includes a menu of previously saved distribution lists.

Figure 10:
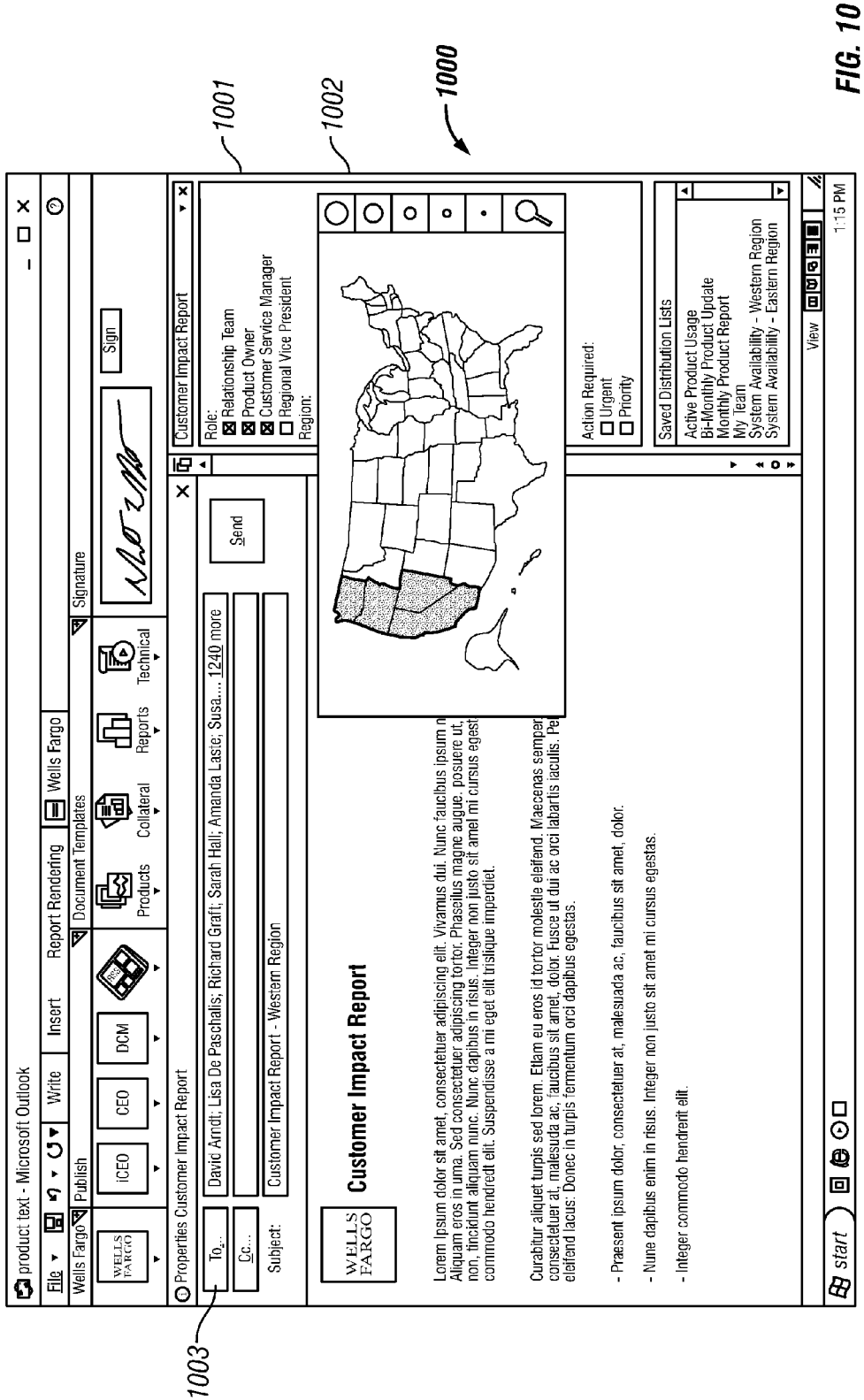

FIG. 10 shows a further view 1000 of the exemplary template. Here the publisher has selected a number of roles 1001, and a region 1002. It is to be appreciated that the system allows the publisher to address a publication by attribute, rather than by selecting individual recipients. As shown here, as the publisher specifies attributes, the recipients' names appear in the 'To:' field 1003 of the addressing block. In another embodiment, described below in more detail, the recipient names are not inserted in the 'To:' field until the attributes of the distribution list are fully specified.

Figure 11:
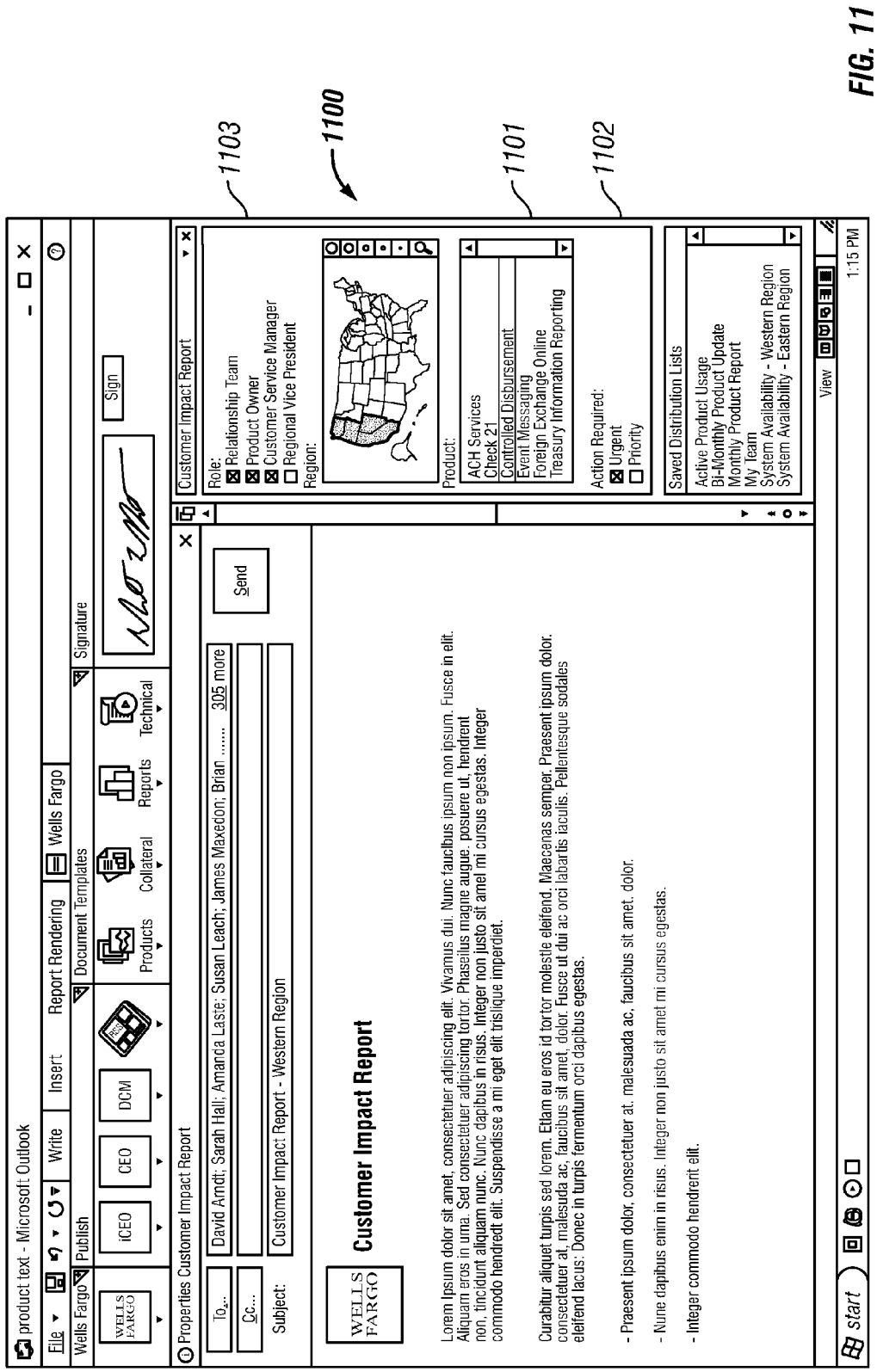
Figure 13:
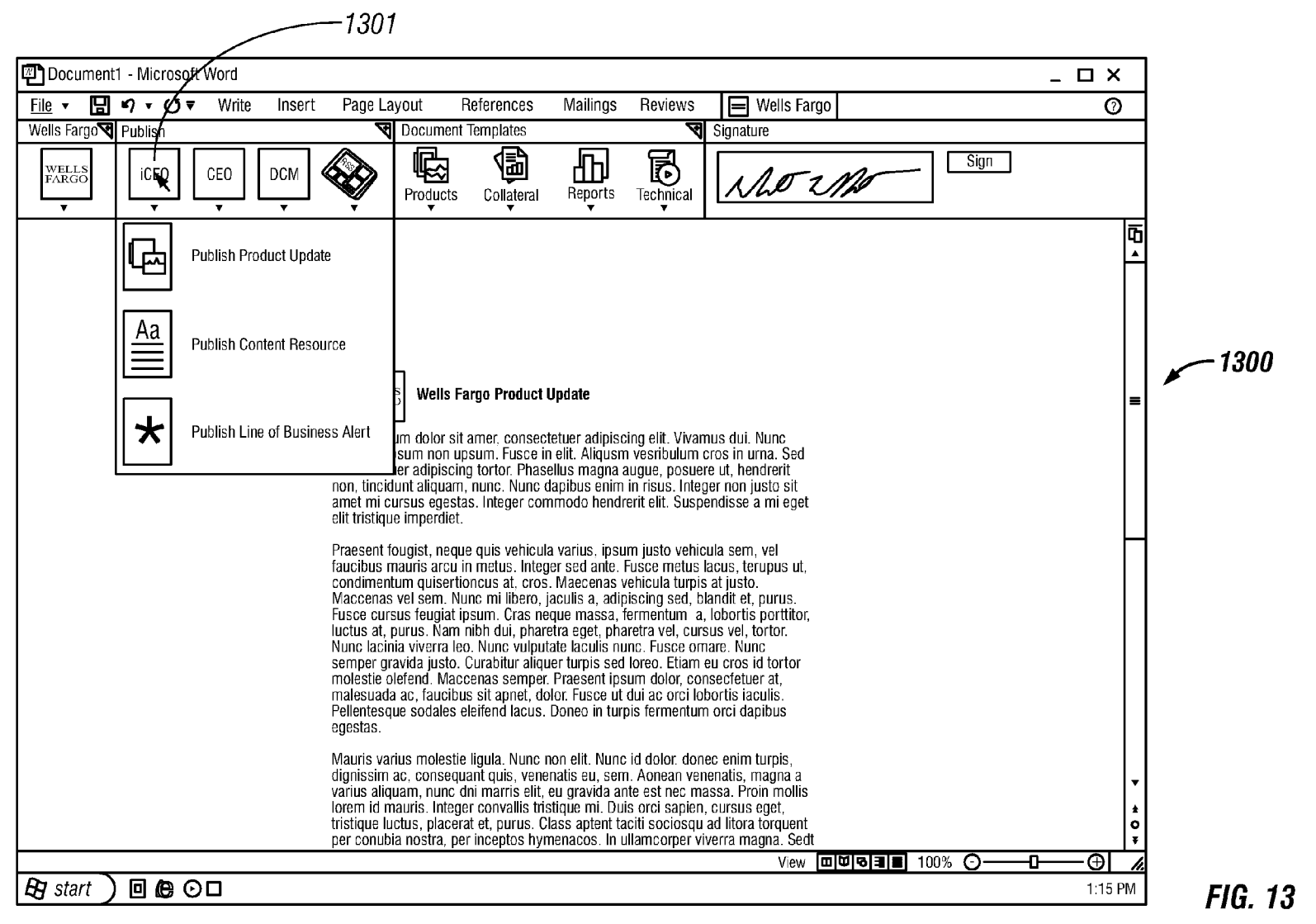

FIG. 11 shows a further view 1100 of the exemplary template. Here the publisher has finished specifying the distribution list attributes, selecting a product 1101 and a priority 1102. The report having been completely drafted and the distribution list having been completely specified, the publisher is ready to publish the report to the recipients on the distribution list by activating an appropriate UI element, here, for example by clicking the 'send' button 1103. FIG. 13, in a further view 1300 of the UI to the messaging application illustrates a further embodiment of the rapid publishing single-click publishing feature, wherein, by selection of the appropriate interactive element 1301, the publisher published a report.

Figure 12:
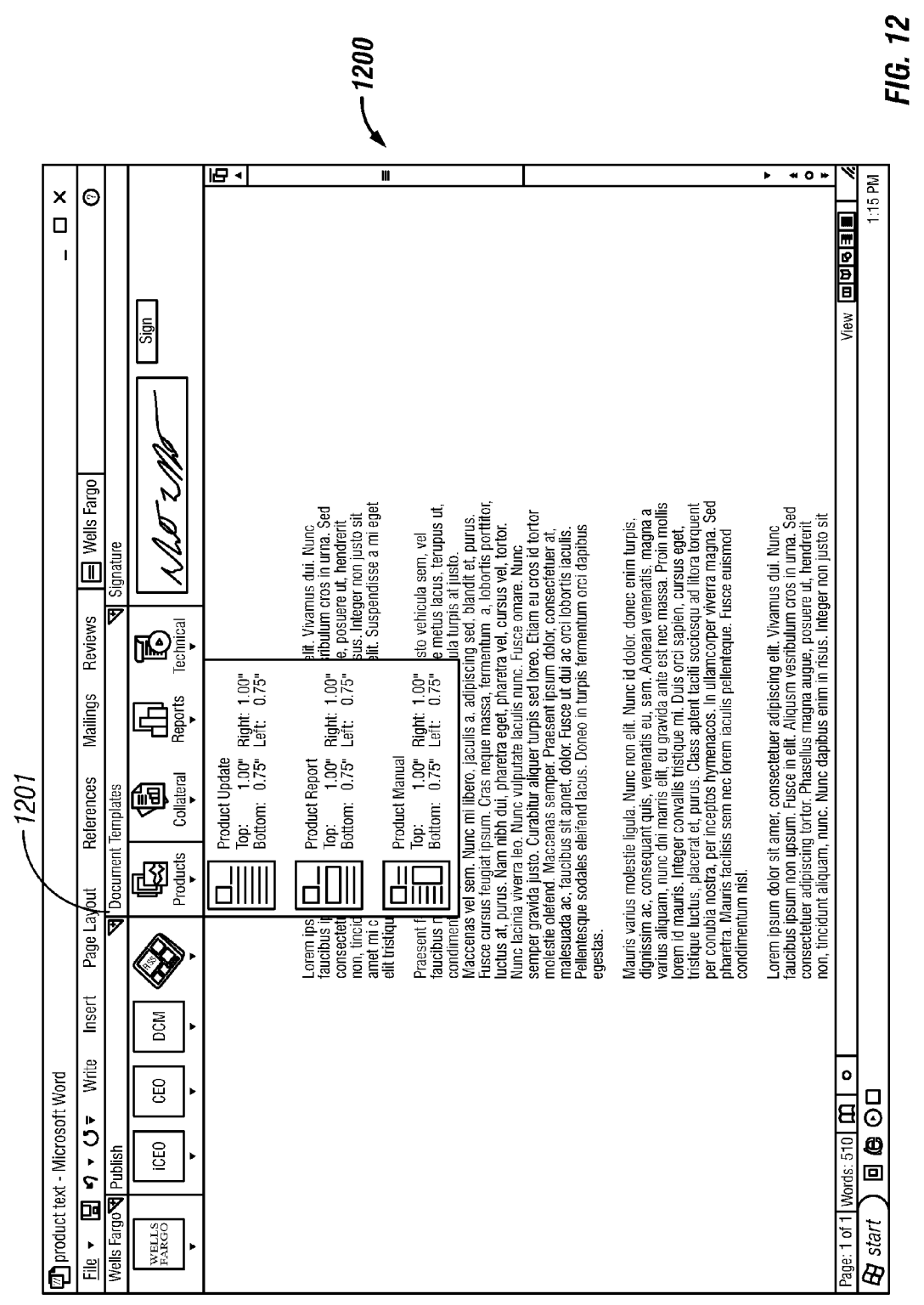

As FIG. 12 shows in a further view 1200 of the UI to the messaging application, the templates provide instant layout capabilities 1201.

FIGS. 14-19 provide several views of a user interface for rapid publishing of documents of from the system of FIG. 1. The system extends and leverages existing office automation software and technologies. To do so, the system creates a secure and validated environment for extensions in the form of signed plug-ins, either originating from within the enterprise or provided by authenticated third-parties. This environment allows the application services to safely interoperate, and allows business rules to be injected into those underlying applications to take advantage of their inherent capabilities in a clear and cohesive manner, allowing the applications to interoperate with enterprise business systems and data in a transparent and secure manner. For example, the system allows users to author and publish from OUTLOOK or WORD directly to a business web portal, blog, OUTLOOK client or wireless device.

Figure 14:
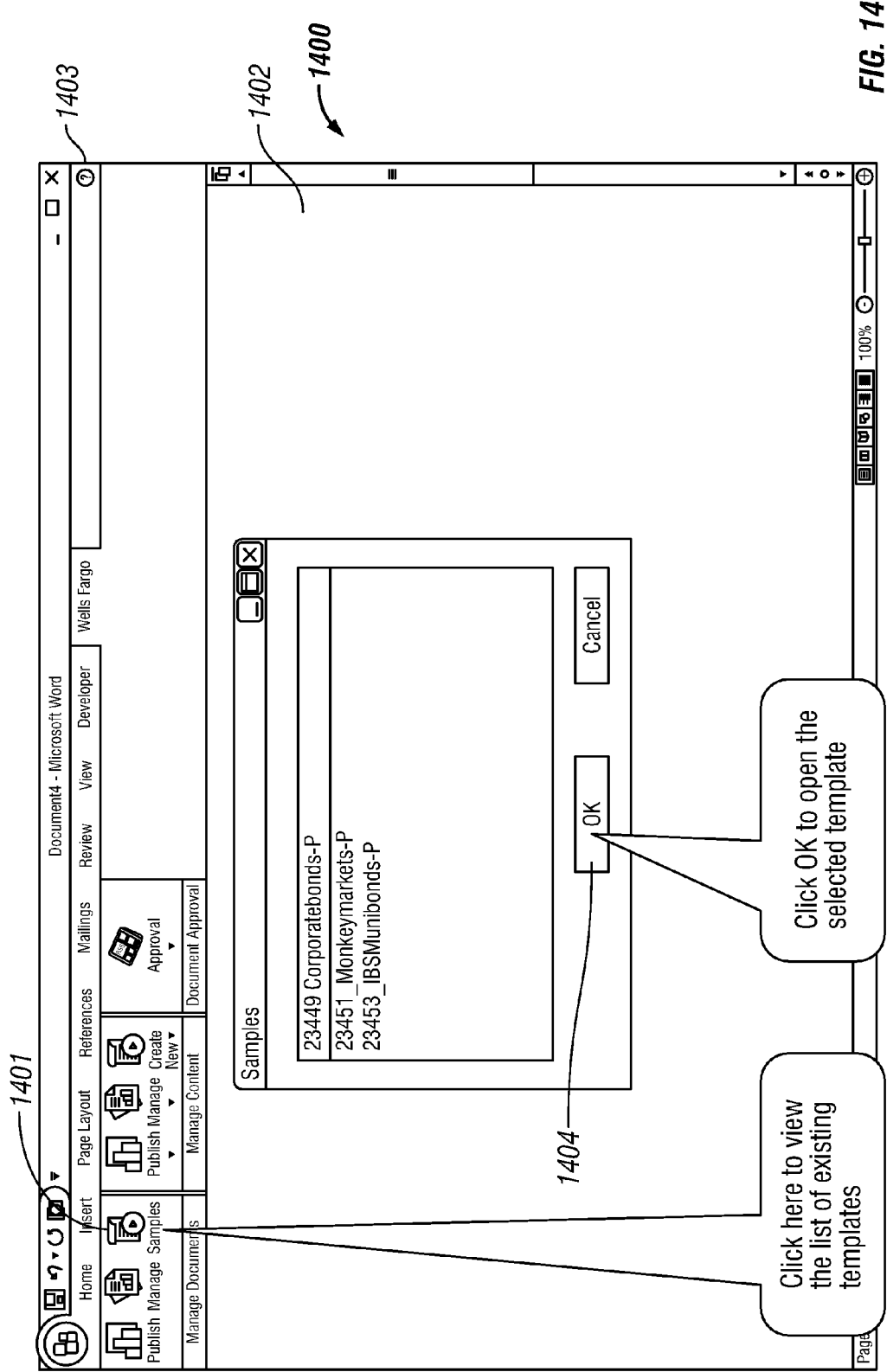
FIGS. 14-19 provide several views of a user interface for rapid publishing of documents from the system of FIG. 1.

As shown in the view 1400 of FIG. 14, the publisher selects a template by first clicking on a menu of templates, here labeled 'samples,' 1401, which launches a text window 1402 containing the list of existing templates. The user selects from the list, for example by highlighting the selection using a pointing device, such as a mouse, and then clicks an 'OK' button to confirm the selection 1404, whereupon the desired template is opened (previously shown). The publisher then drafts the document, after which time, he is ready to publish it. Clicking the appropriate interactive element, for example a 'publish' button 1502, triggers display of a window 1501 for specifying document metadata. In an exemplary embodiment, the metadata may include any of:

title;
whether or not the document is searchable;
a page description;
content owner;
editorial type;
targeted audience;
effective date;
expiration date;
approval information; and
email of approver.

After the publisher enters the metadata, clicking a 'publish' button 1503 causes the document to be published to the places needed in one click instead or needing to be separately publishing to each channel. As shown in the web page 1600 of FIG. 16, the document 1601 is published to page on an intranet or a portal or an Internet site, for example.

It is to be appreciated that, through the metadata that the publisher embeds; the distribution for the document can be specified, for example by specifying the target audience and through the sweet spot engine is able to get additional recipients as designated in the process. Additionally, using the metadata, the publisher is able to specify a workflow for the document, for example, by specifying that approval for the document is required and entering the email address of the approving authority. The system considerably extends and leverages the methods by which current office automation software and technologies can address or direct communications to recipients. For example, present technologies do not transparently allow the creation of workflow within the editing process. The system extends underlying messaging and communication systems with the ability to implement basic workflow in a clear, easy-to-use and secure manner.

As shown in the view 1700, individual users can view documents distributed to them by selecting a 'manage' button 1702, whereupon a text box 1701 is triggered displaying the documents routed to the users. Users receiving the documents at their workstations are typically those users on the distribution list that the publisher created when she was authoring the document. The user can select the document, for example by highlighting with a selection tool, such as a mouse. She confirms her selection by clicking, the 'OK' button 1703, whereupon the document is opened and displayed to her.

As explained above, the publisher is enabled to specify a workflow for the document in the metadata. For example, the publisher can specify one or more parties to review a document prior to publishing. Documents for approval may be routed to the approver by email. In the email, the approver may be presented with a link 1801 to the document, as shown in view 1800. Selecting the link may cause the document to be displayed, as in view 1900. The reviewer, after completing her review, can approve or reject the document by activating an 'approve/reject' interactive element 1901. If the document is approved, it is published as specified. In another embodiment, the reviewer may alter the document metadata, which may alter the distribution or workflow for the document. If the document is rejected, it may be returned to the content owner or publisher.

Figure 15:
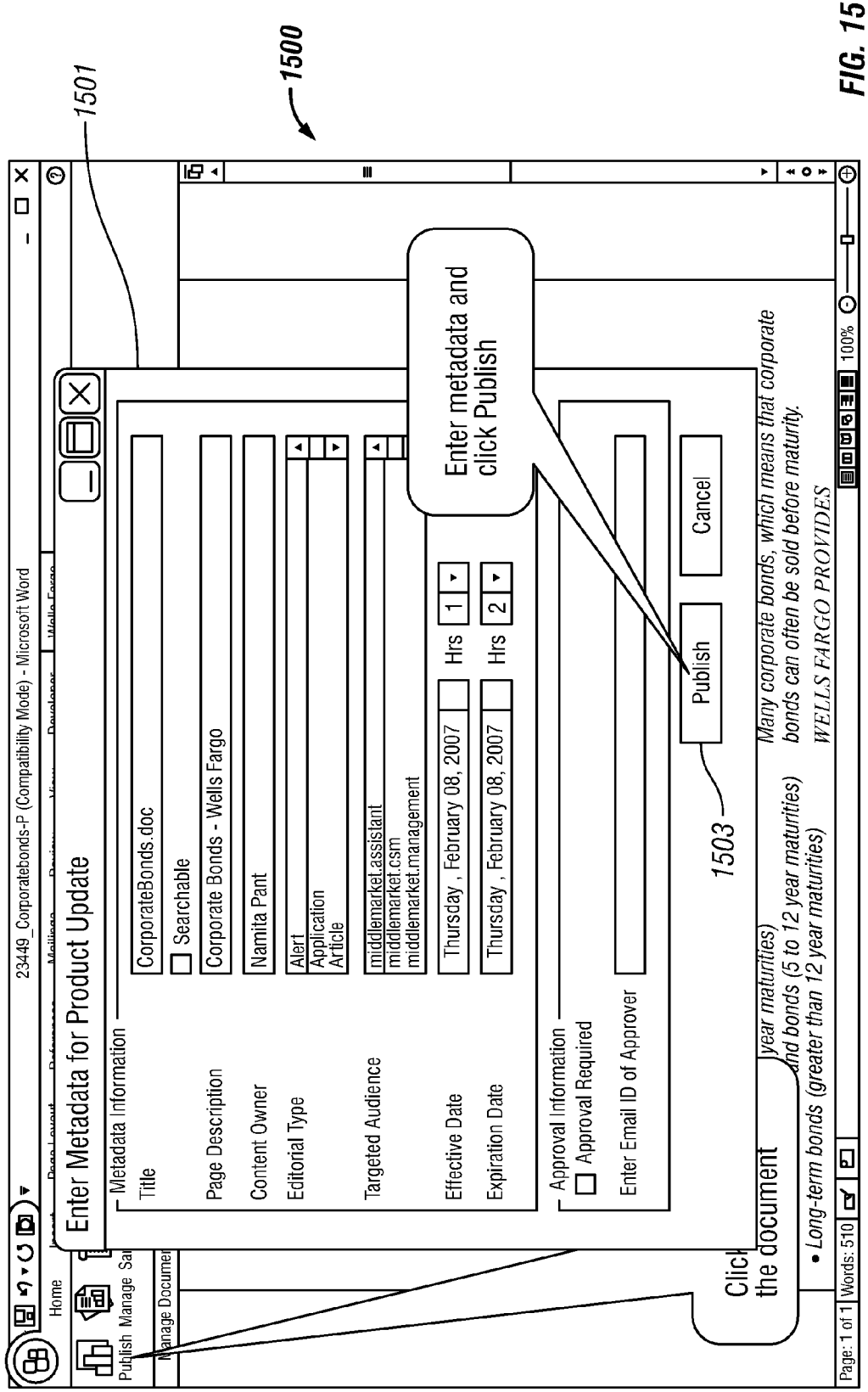
Figure 16:
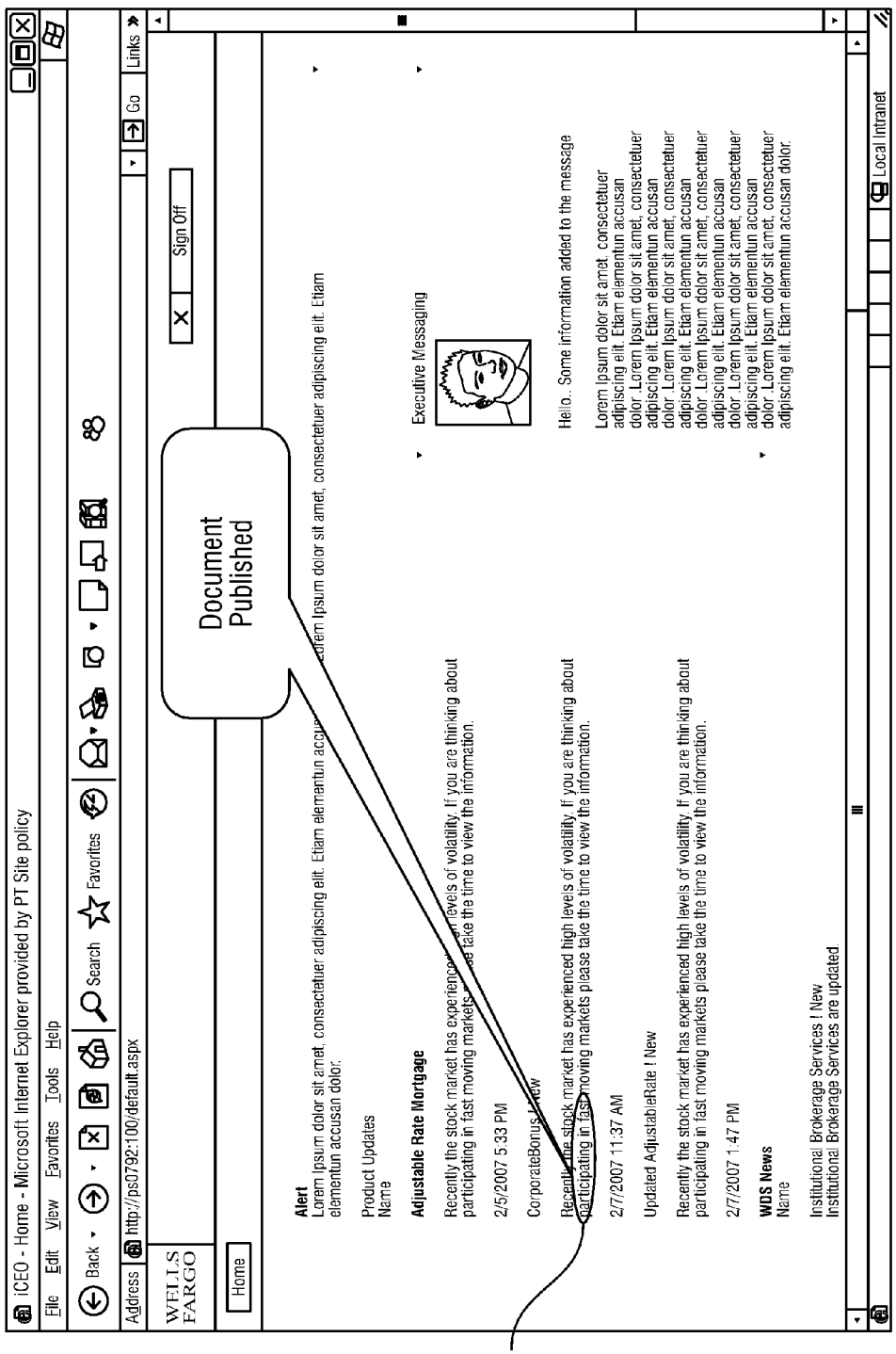
Figure 17:
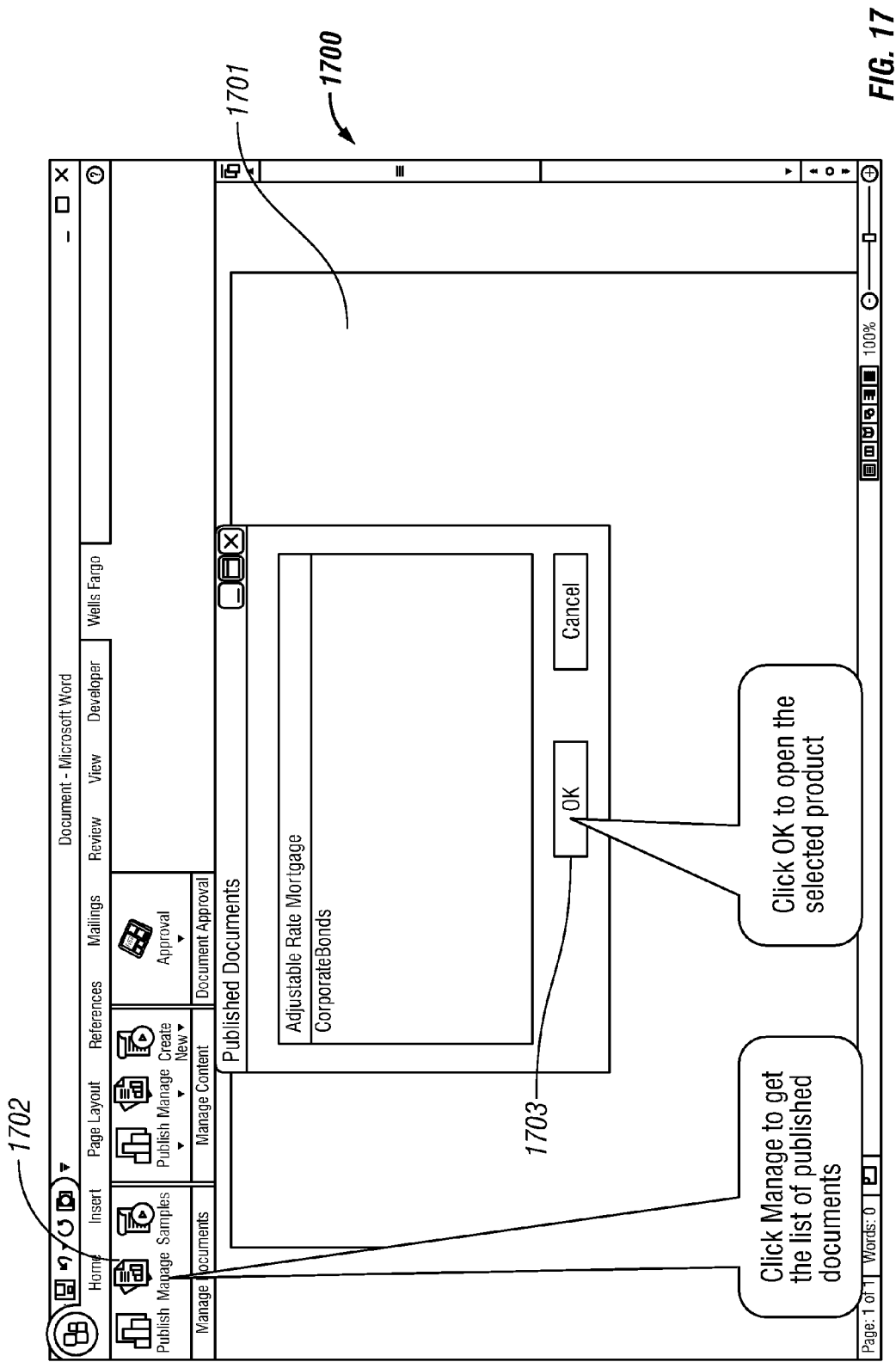
Figure 18:
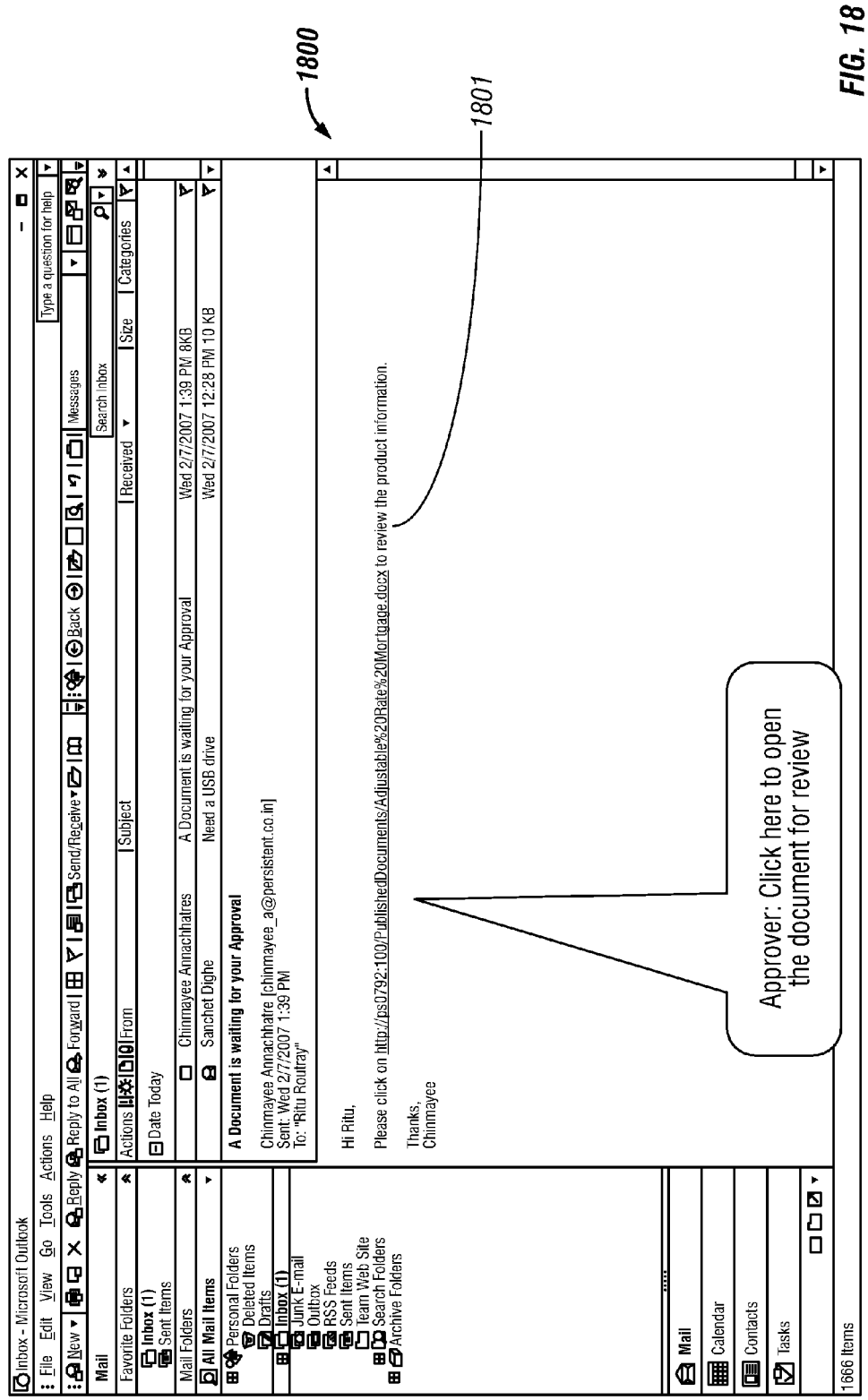
Figure 19:
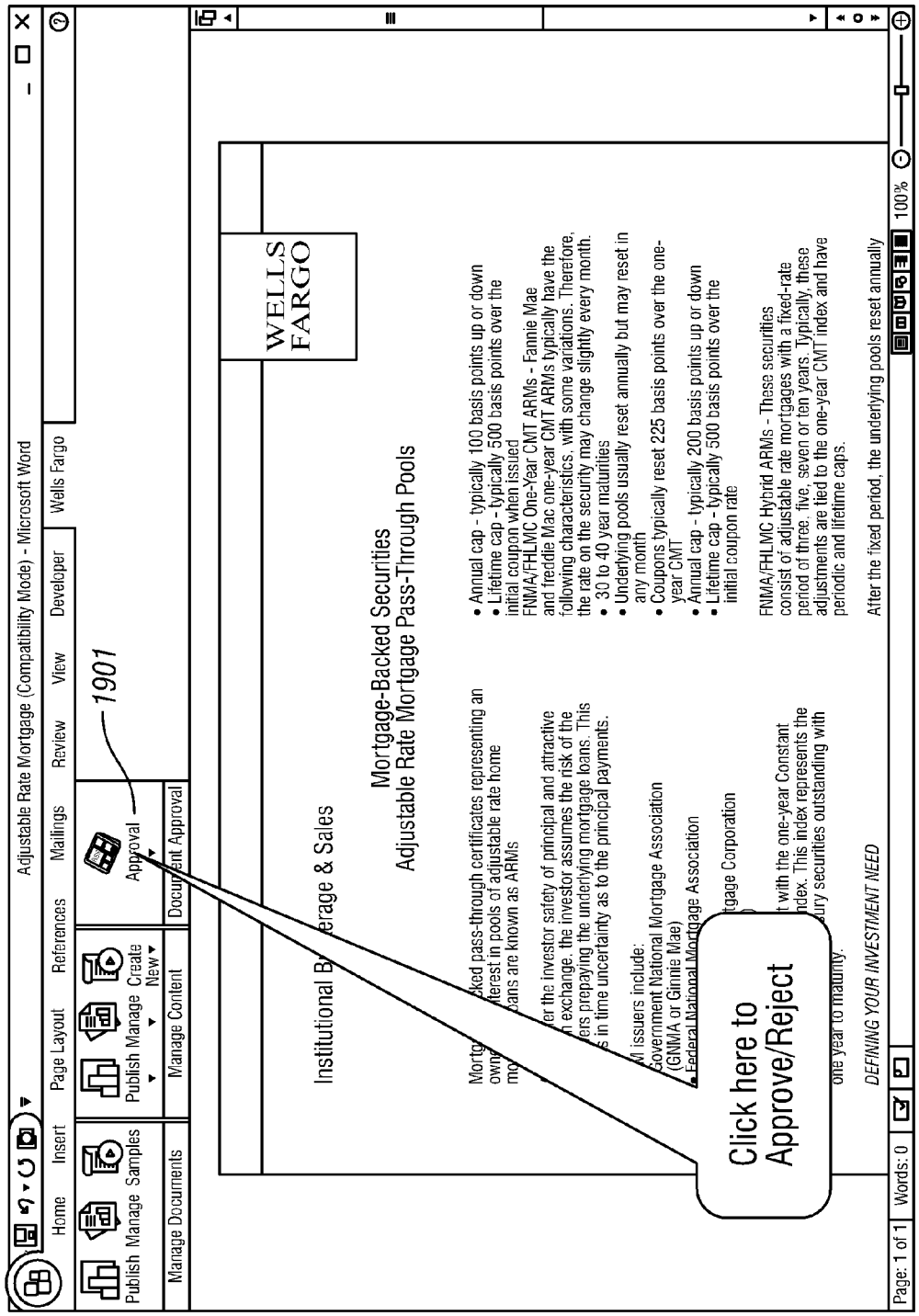
Figure 20:
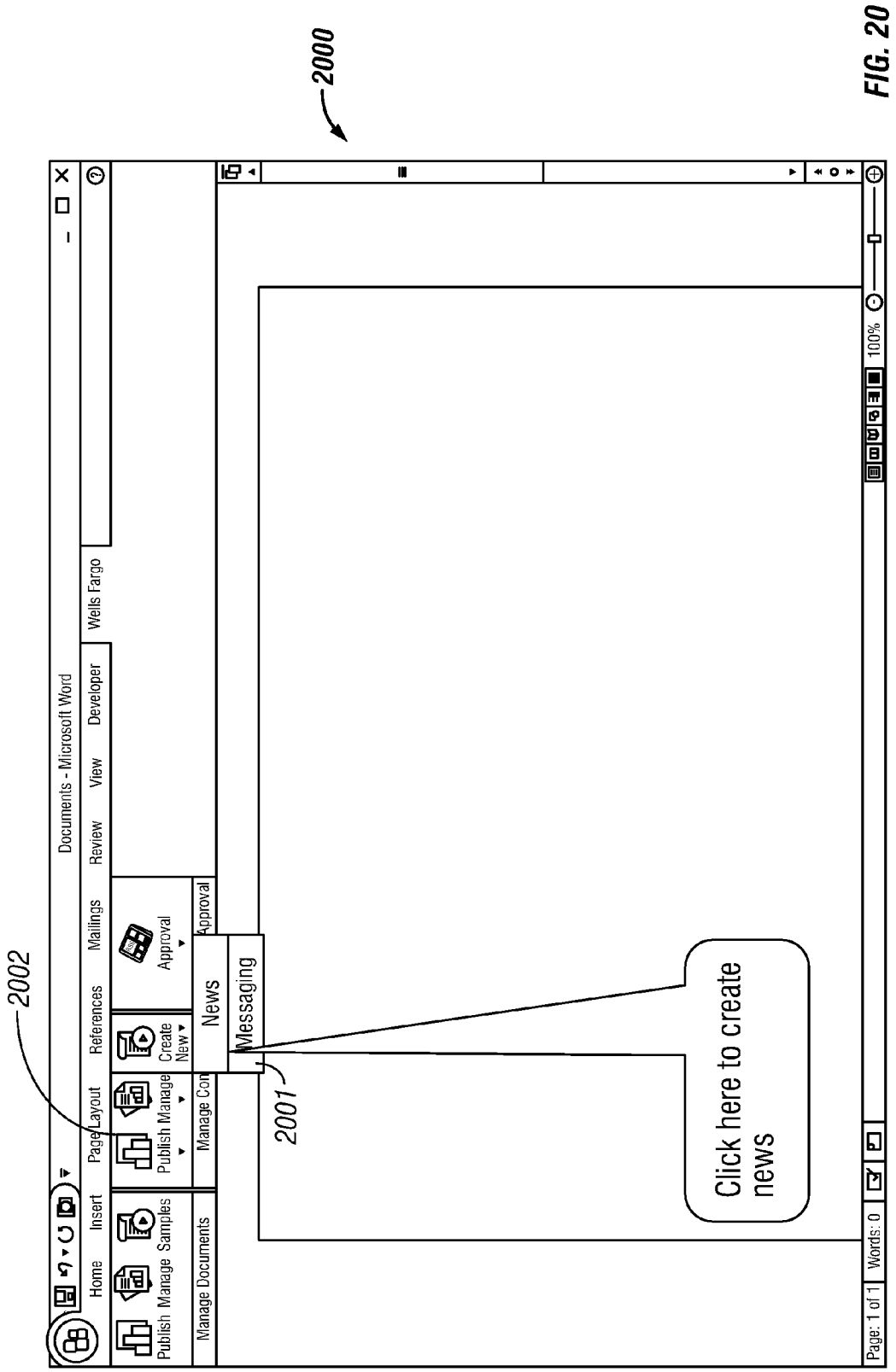
Figure 21:
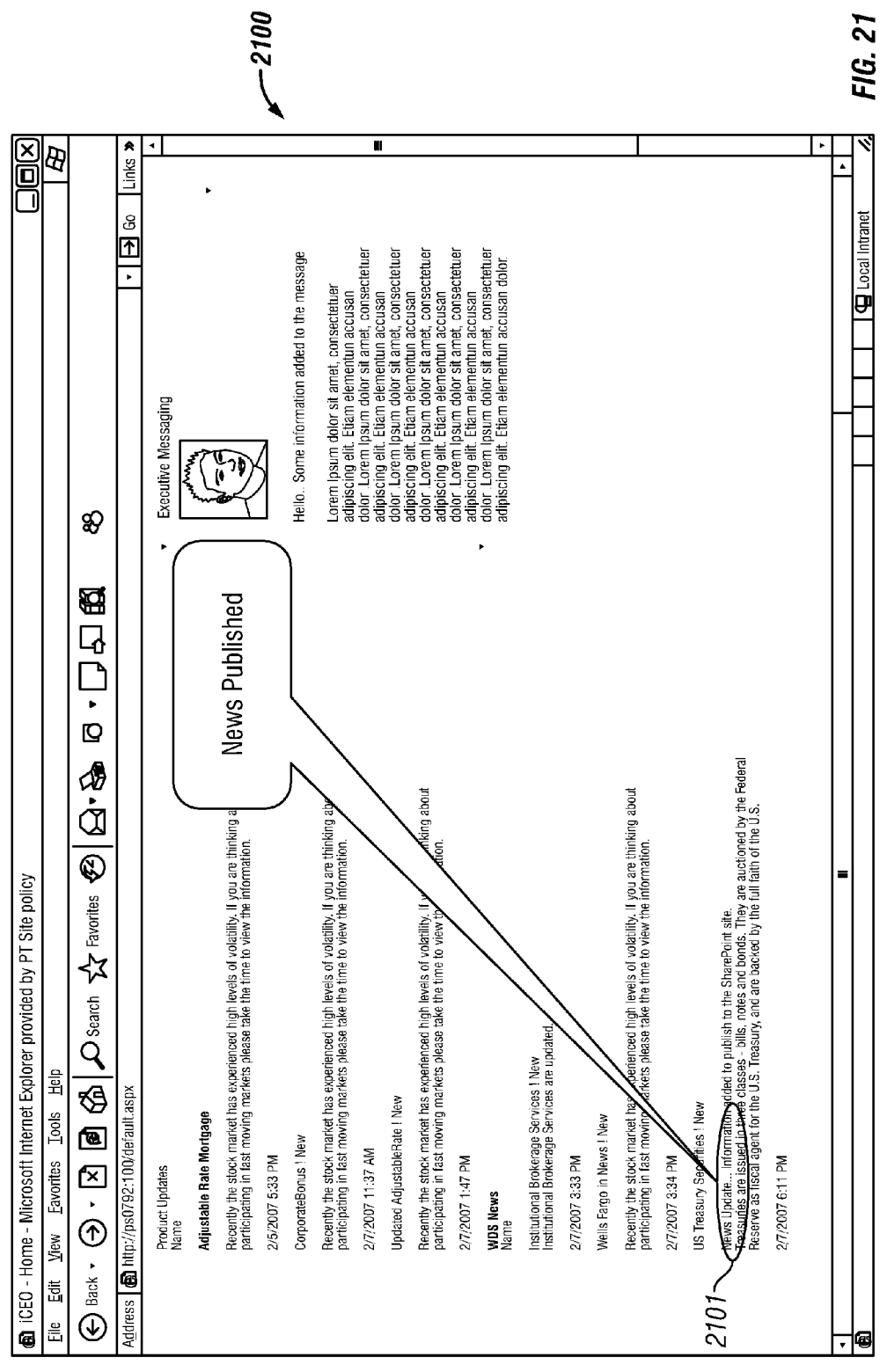
Figure 22:
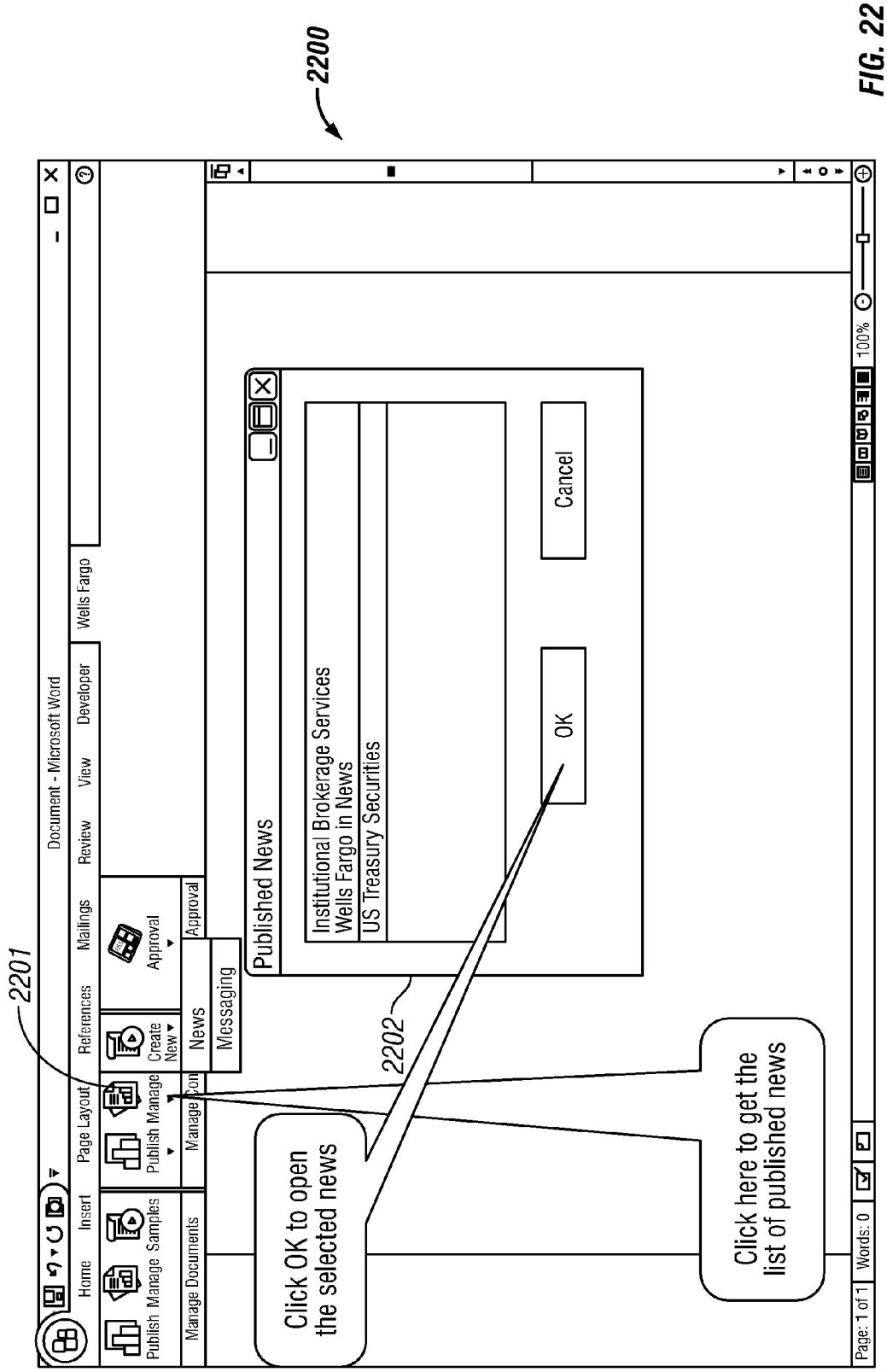

FIGS. 20-22 provide several views of a user interface for rapid news publishing from the system of FIG. 1;

As shown in view 2000 of FIG. 20, the system also enables users to publish news rapidly with a single click. The user selects the appropriate user interface element 2001 to create news. After creating news, the news publisher selects the 'publish' button 2002. Selecting the 'publish' button triggers display of a metadata entry window, as shown in FIG. 15. After entering the metadata, the news publisher may select a 'publish' button, whereupon the news is published, as shown in FIG. 21, on a portal or intranet or web site. As with documents, depending on the workflow specified in the metadata, the news may require review by one or more additional parties prior to publishing, in which case, it may go through the review process previously described.

As shown in FIG. 22, individual users can view news targeted to them by selecting a 'manage' button 2201, whereupon a text box 2202 is triggered displaying the news that the user has yet to view. Users receiving the news at their workstations will typically be those users on the distribution list that the news publisher created when they were authoring the news item.

Figure 23:
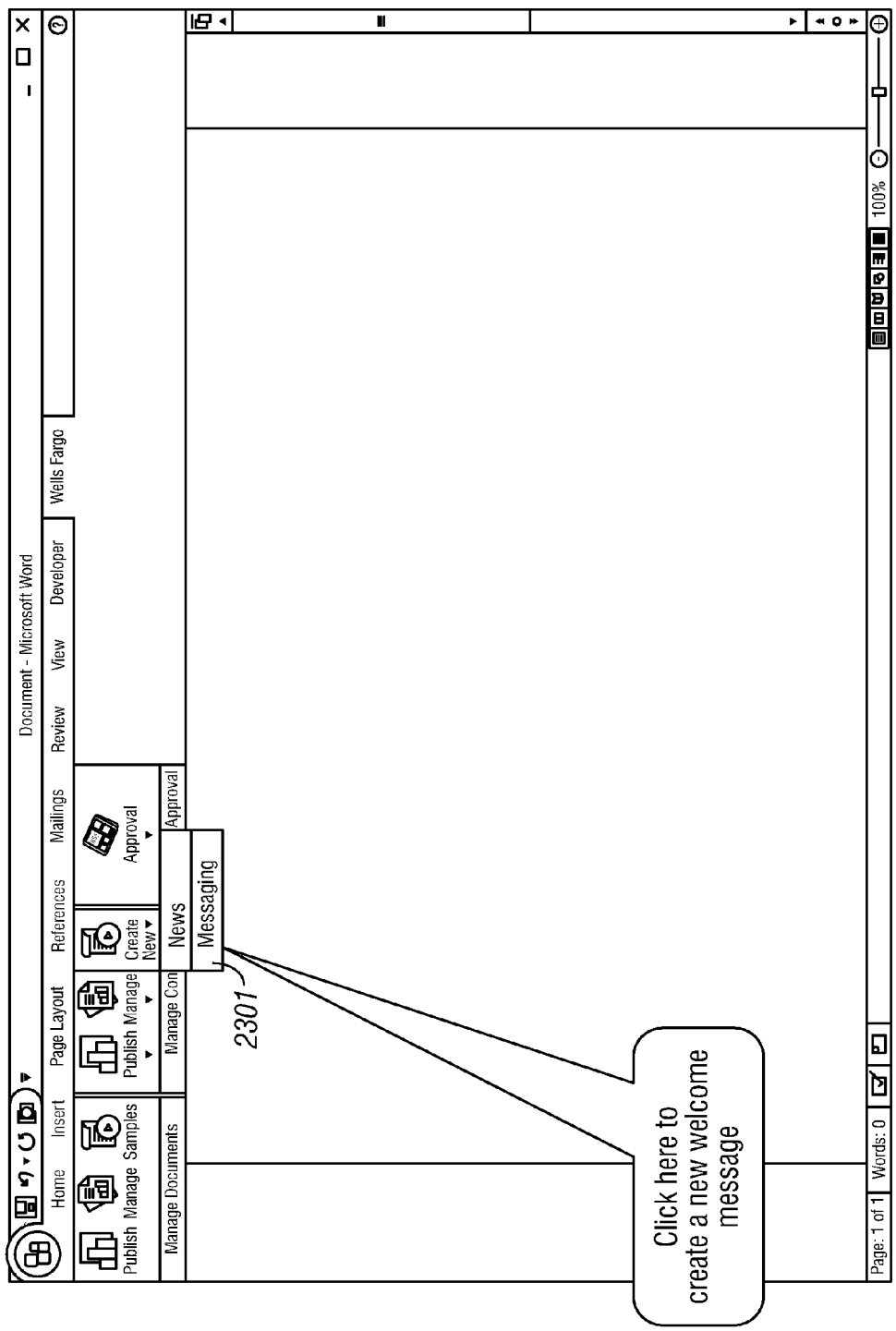
FIG. 23 provides a view of user interface for rapid message publishing from the system of FIG. 1.

FIG. 23 provides a view of a user interface for rapid message publishing from the system of FIG. 1. As shown in view 2300, users are also enabled to publish messages in much the same manner as they can publish documents and news using a plurality of structured message types 105. Rapid messaging provides features analogous to those in rapid publishing of documents and news: single-click publishing, embedded metadata, workflow, and dynamic distribution.

Figure 24:
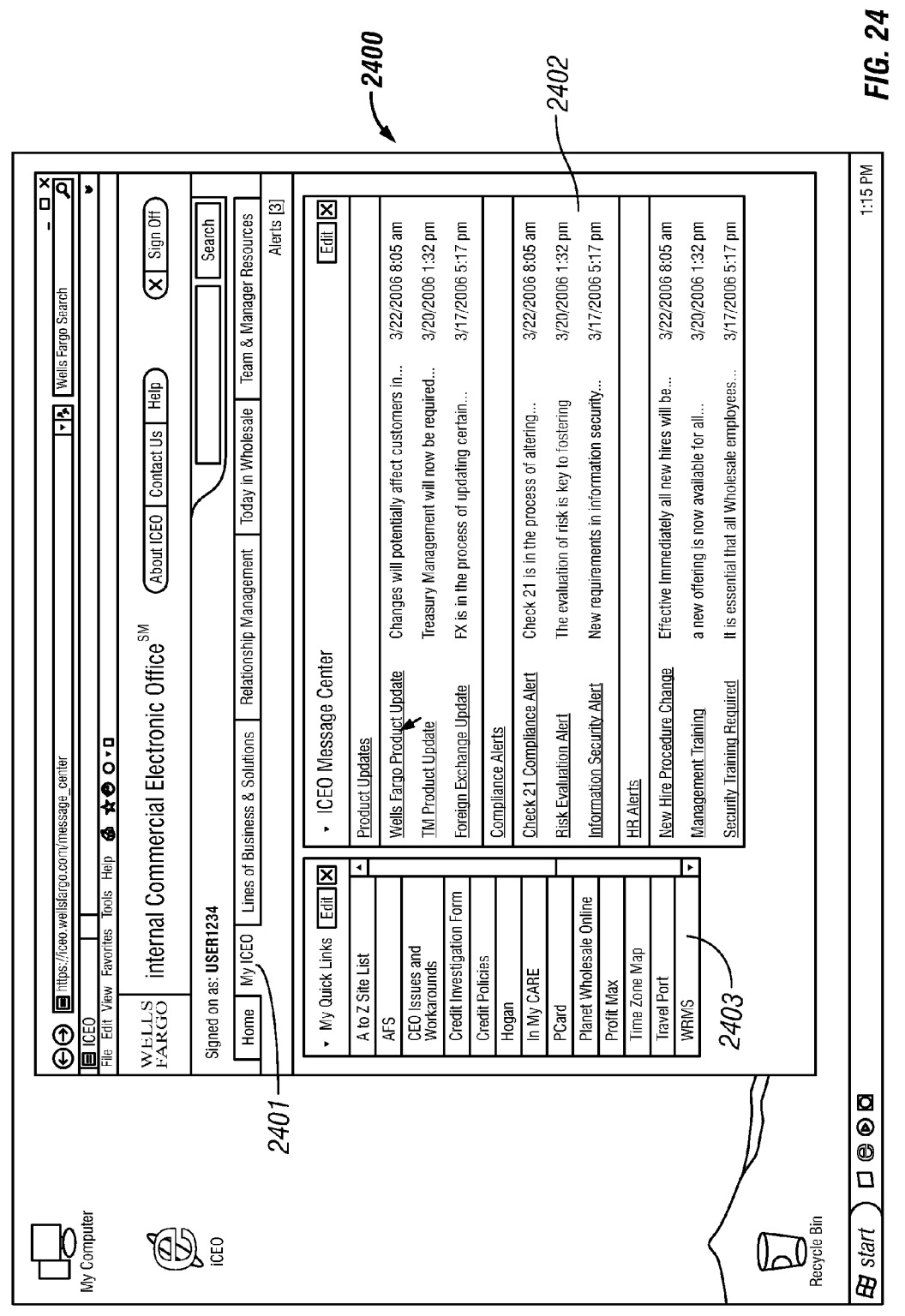

FIG. 24 provides a view 2400 of a user interface 2402 for an integrated message center, within a user interface to an enterprise portal from the system of FIG. 1. The user is enabled to navigate to the integrated message center by selecting a user interface element, for example a selectable tab 2401. The categories of communications displayed within the message center interface 2402 are determined by the user's subscriptions.

Figure 25:
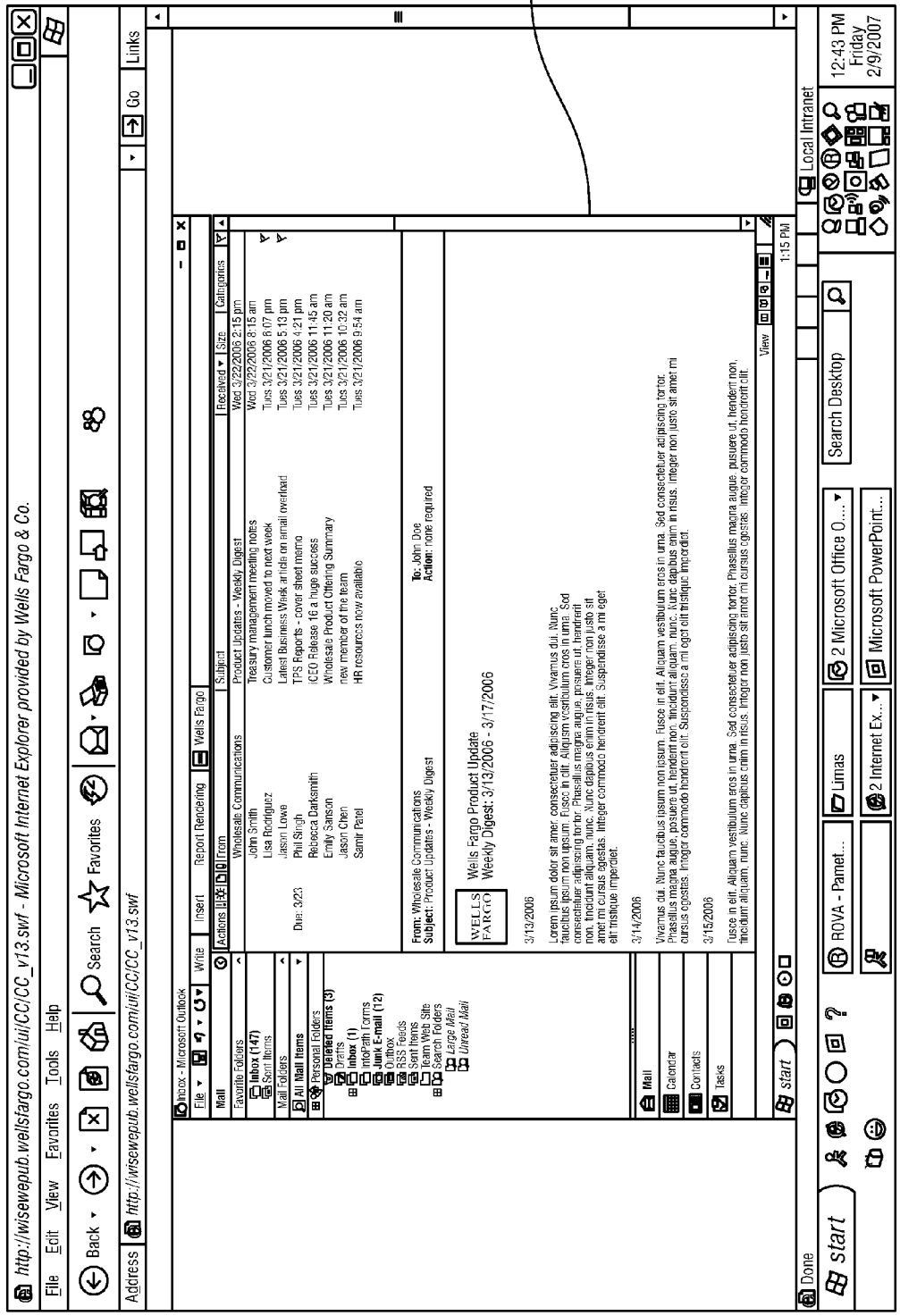

FIG. 25 shows a view 2500 of a user interface to an email client. As previously described, when subscribing to a particular communication type, the recipient is enabled to specify the at least the channel, the format and the frequency with which they receive the communication. Here, the open message is that of a weekly digest of a regularly issued product update. Had the recipient expressed so in the preferences for this particular communication, he or she could have received product updates as they were published, instead of receiving a weekly digest. Additionally, the recipient could have, for example, specified that he wanted them published to his personal page on the enterprise portal, or that they be delivered to the recipient's wireless device, for example.

Figure 26:
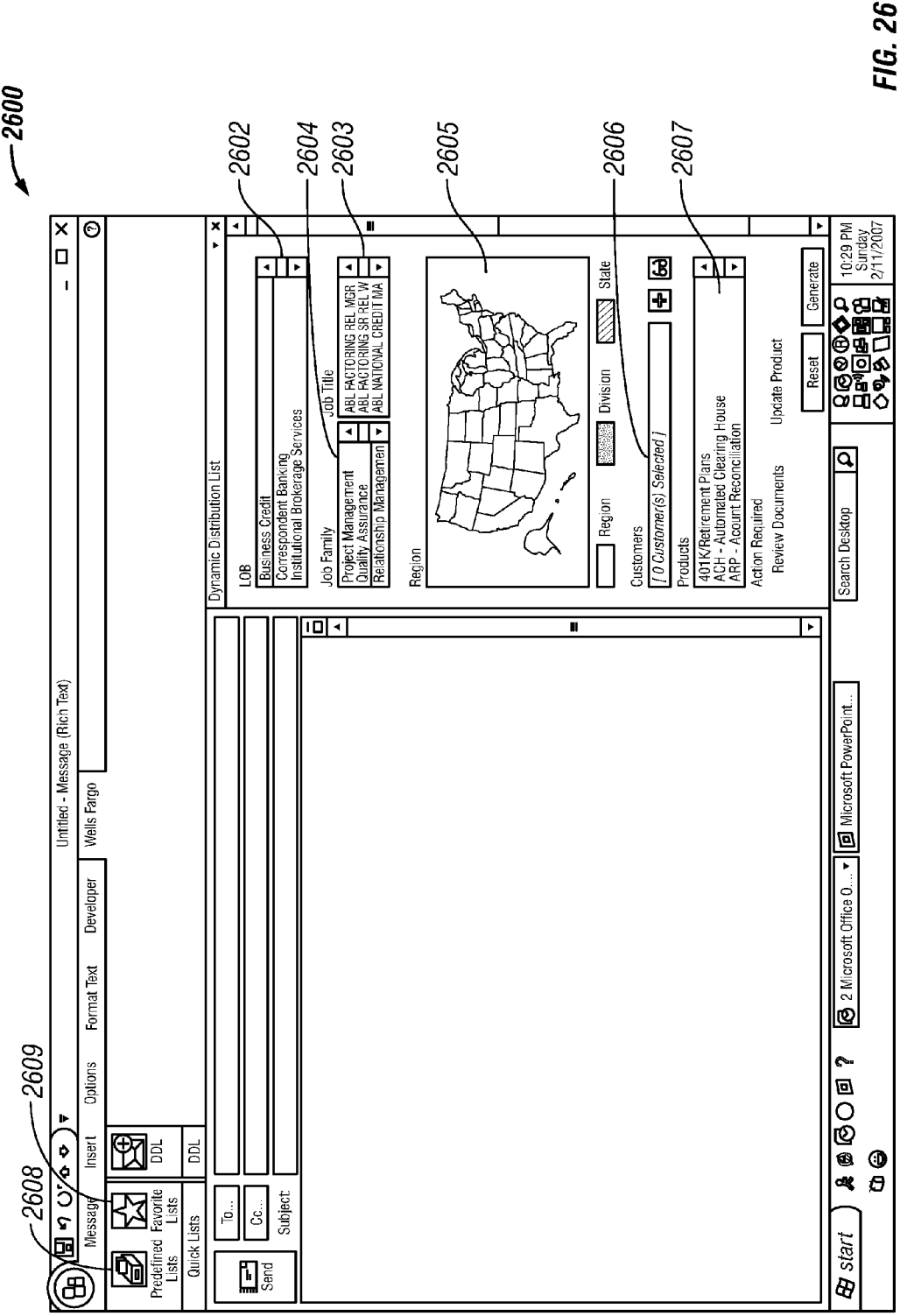
FIGS. 26-32 provide several views of a user interface of configuring dynamic distribution lists from the system of FIG. 1.

As in the foregoing description, the system provides the capability of generating dynamic distribution lists wherein communications are addressed logically to recipients according to, for example, role, and customer, interest or content type, instead of the conventional approach of identity-based addressing. FIGS. 26-32 provide several views of a user interface for configuring dynamic distribution lists. FIG. 26 shows a view 2600 of a messaging client, that includes a user interface 2601 for configuring a dynamic distribution list (DDL). Using the example shown in FIG. 26, a publisher is enabled to configure a DDL according to any of: line-of-business 2602, job family 2604, job title 2603, geographic region 2605, customer 2606 and product 2607. In the example shown, the LOB selected is "business credit" and the job family selected is "Relationship management." Thus, the preliminary criteria for this particular list are those recipients working in the LOB of "Business credit" who have jobs in the general family of "Relationship management." One ordinarily-skilled in the art will appreciate that selection of criteria from the various lists may have the effect of generating a query, wherein the selected criteria may be joined with the other criteria using the AND Boolean operator. The ordinarily-skilled practitioner will also recognize that the selection of more than one option within one criterion, for example two different business lines, may have the effect of joining those criteria in the query with the OR Boolean operator. The foregoing list of address parameters is intended to be illustrative rather than limiting. Other addressing parameters will occur to the ordinarily-skilled practitioner and are within the scope of the invention. Other examples might be accounting unit, building, city, or users of a particular system.

Figure 27:
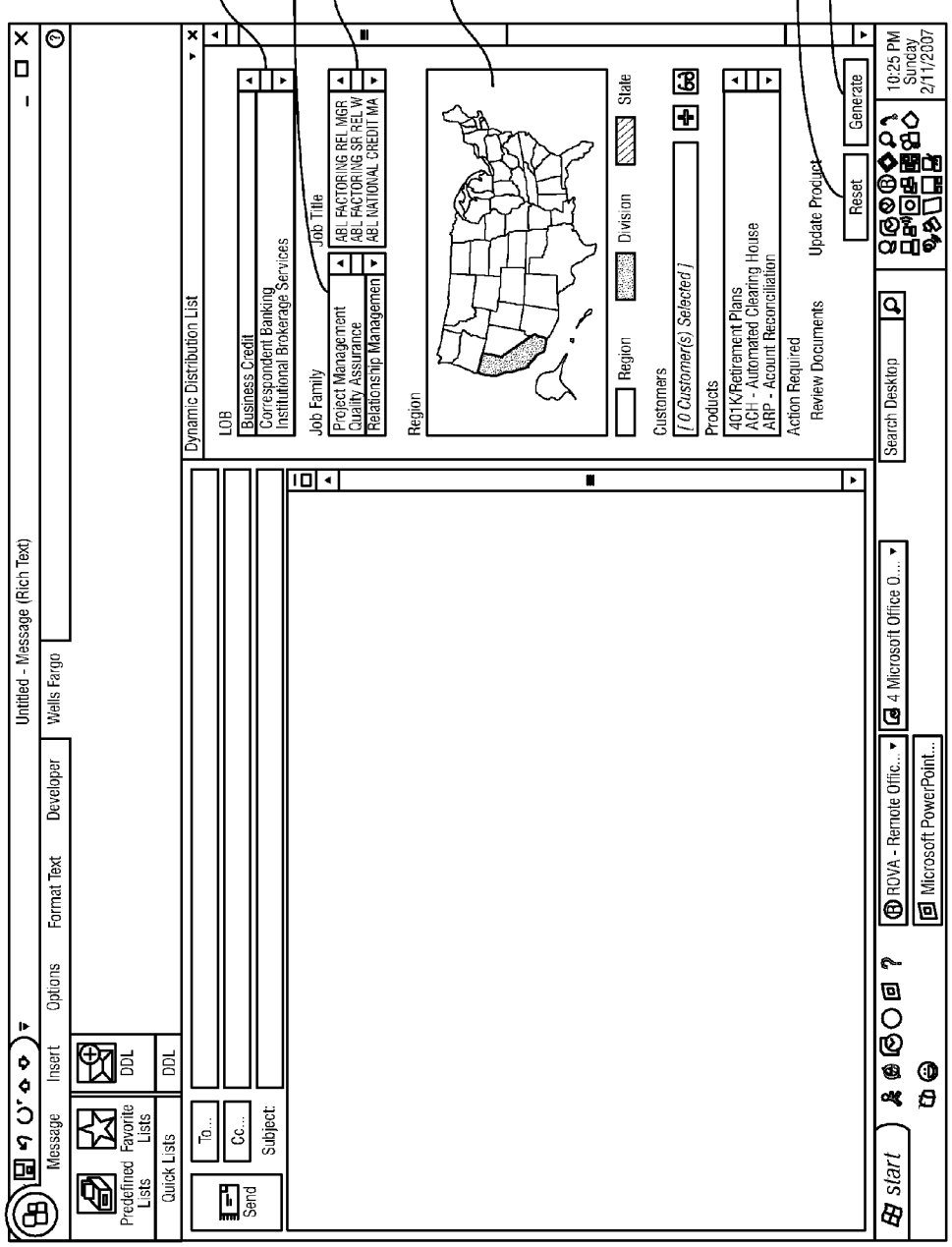

Referring now to FIG. 27, the fields 2701, 2702, and 2703 correspond to 2602, 2603 and 2604 in FIG. 26, respectively. FIG. 27 demonstrates the addition of regional criteria to the configuration for a DDL. Here, by selecting the particular geographic region on the displayed map 2704, the publisher adds the selected geographic region to the query. In the example shown, the geographic criteria include any of 'region,' 'division' and 'state.' Here, the California division is selected, with the effect that the DDL, when generated will include those recipients working in the LOB of "Business credit" who have jobs in the general family of "Relationship management" only in the California division. A 'reset' button 2705 allows the publisher to clear the criteria selected and to start over, if desired. Selection of a 'generate' button 2706 causes the DDL to be generated. The ordinarily-skilled practitioner will recognize that generating the DDL has the effect of joining disparate tables within a database according to the specified criteria and returning a result set that satisfies the criteria.

Figure 28:
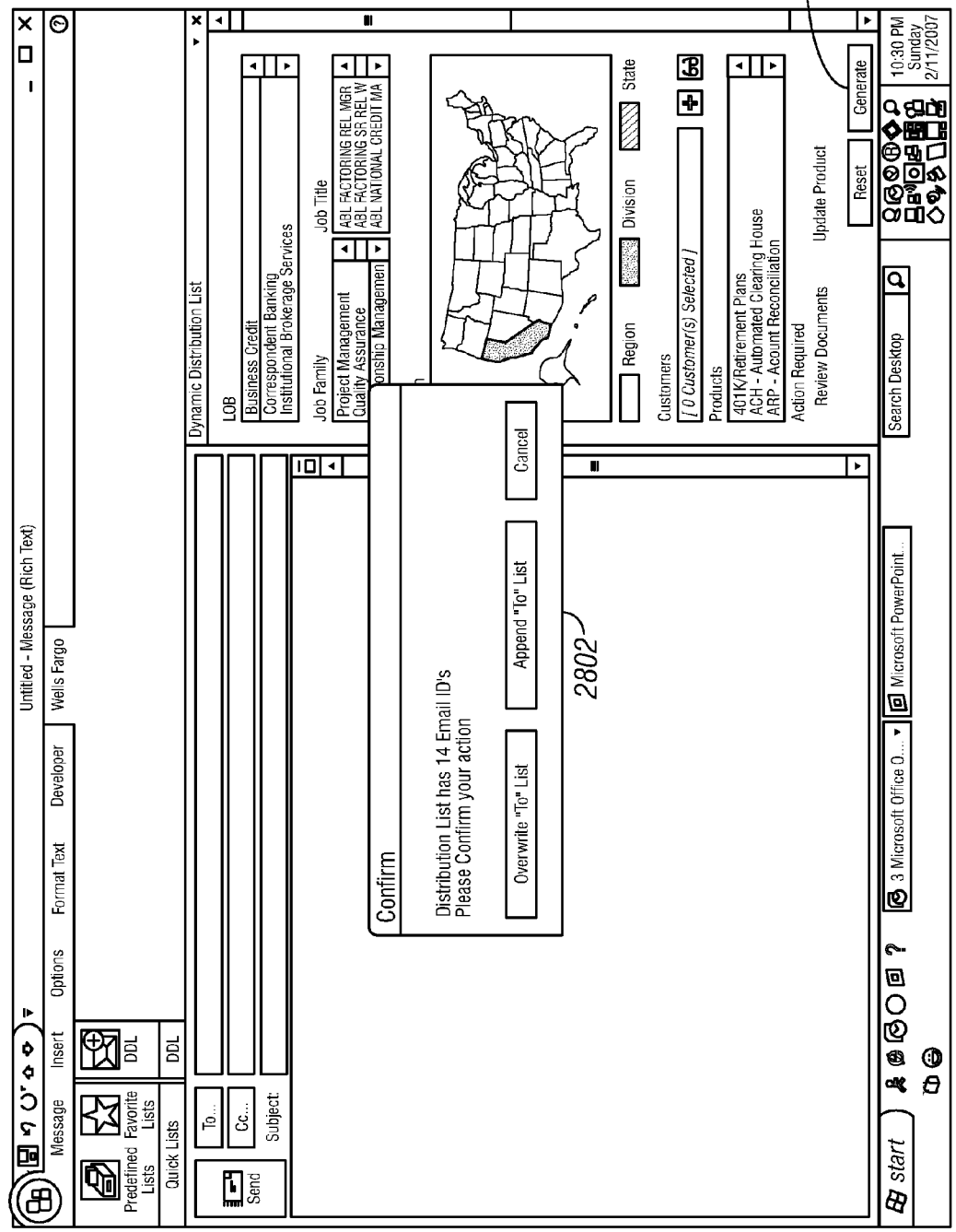

Turning now to view 2800 in FIG. 28, when the publisher generates the DDL by selecting the 'generate' button, the system displays a text box 2802 advising the publisher that the generated list contains 14 email addresses and requesting confirmation from the publisher. In the example shown, possible responses include: 'Overwrite "To:" List,' 'Append "To:" list' and 'Cancel.' Here, the append option is grayed-out to show that it is not available because no other list has been selected to append the newly generated one to.

Figure 29:
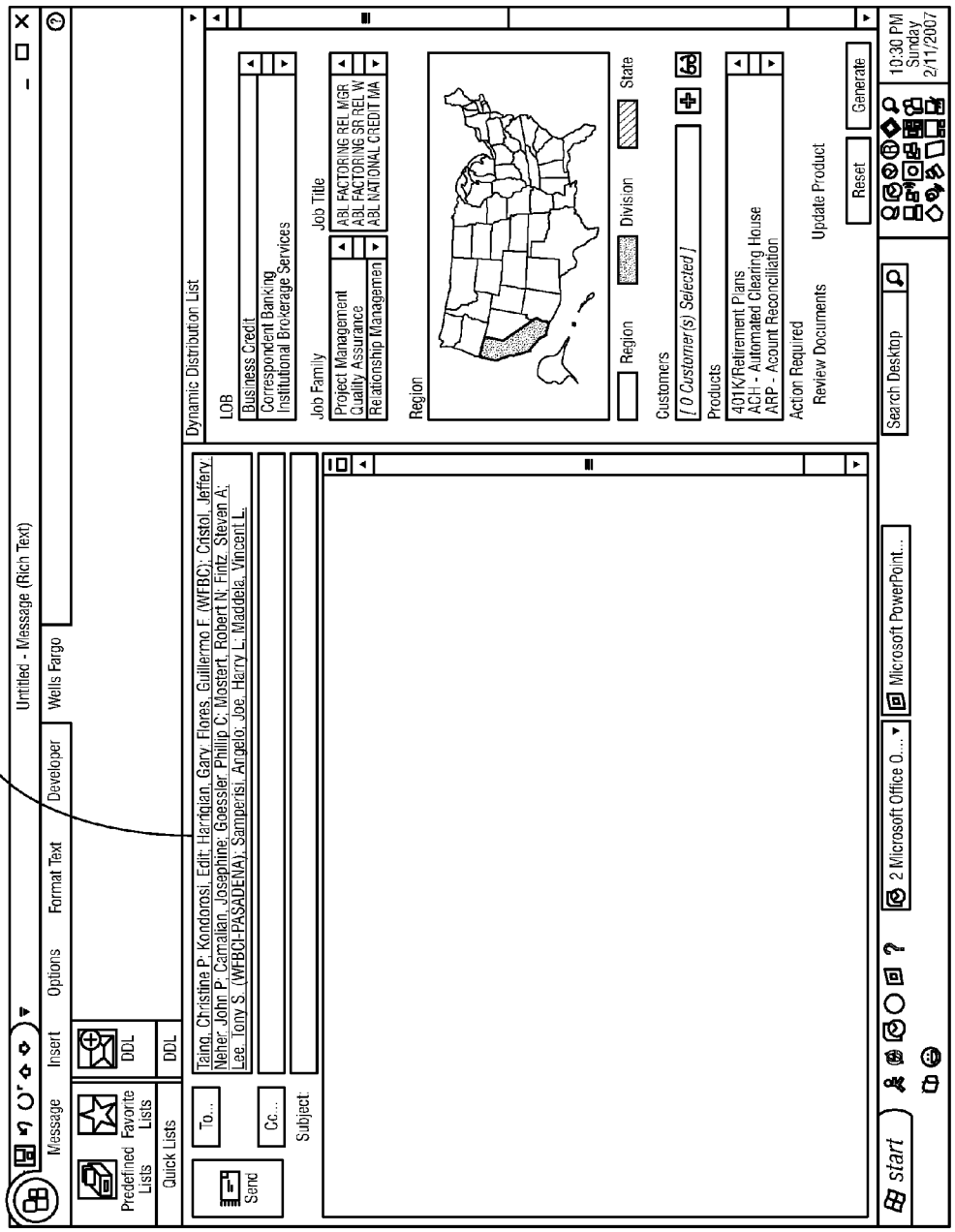
Figure 30:
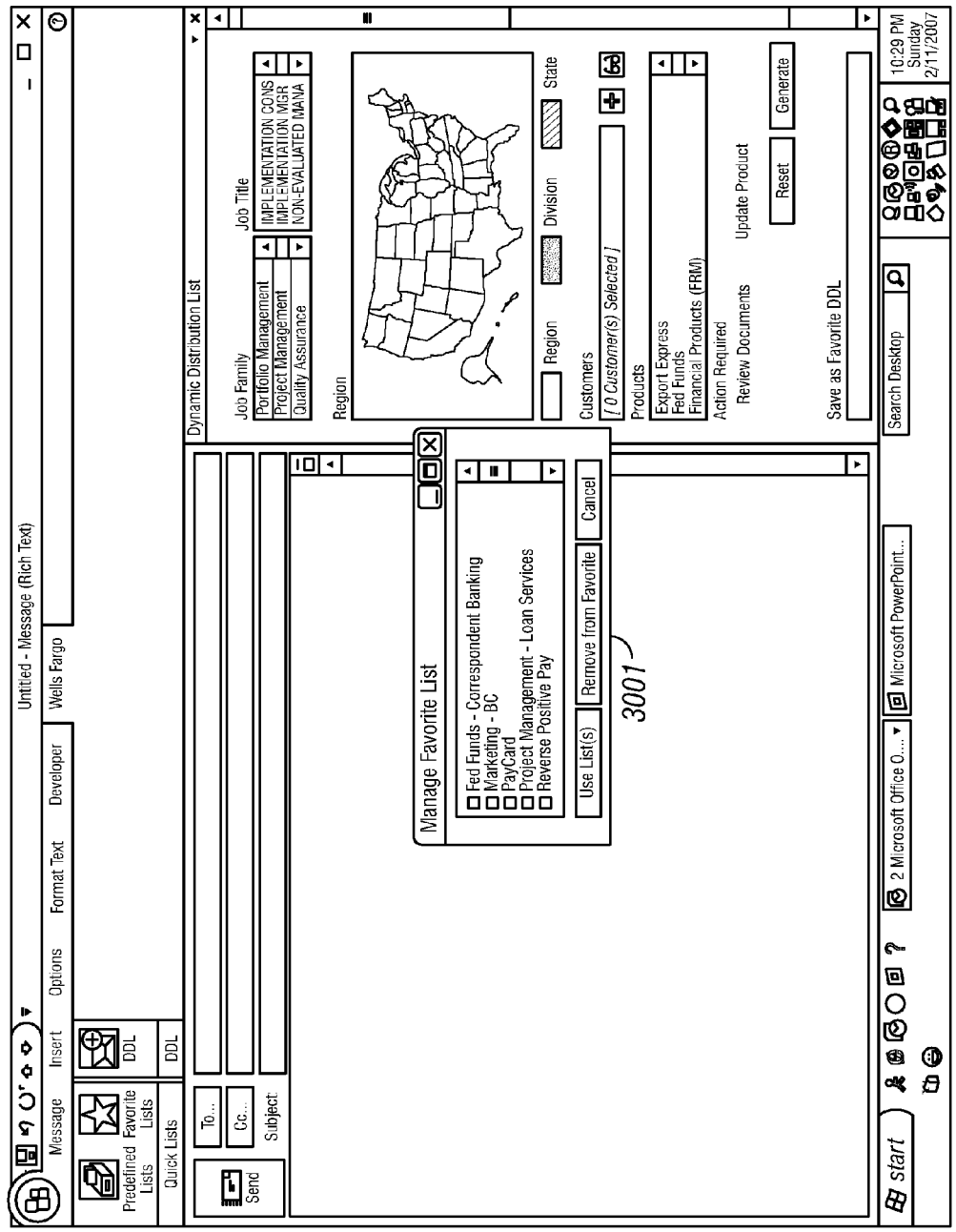

As shown in the view 2900 of FIG. 29, confirming the action of overwriting the "To:" list has the effect of populating the "To:" field in the message with the fourteen email addresses that satisfy the criteria specified.

Figure 31:
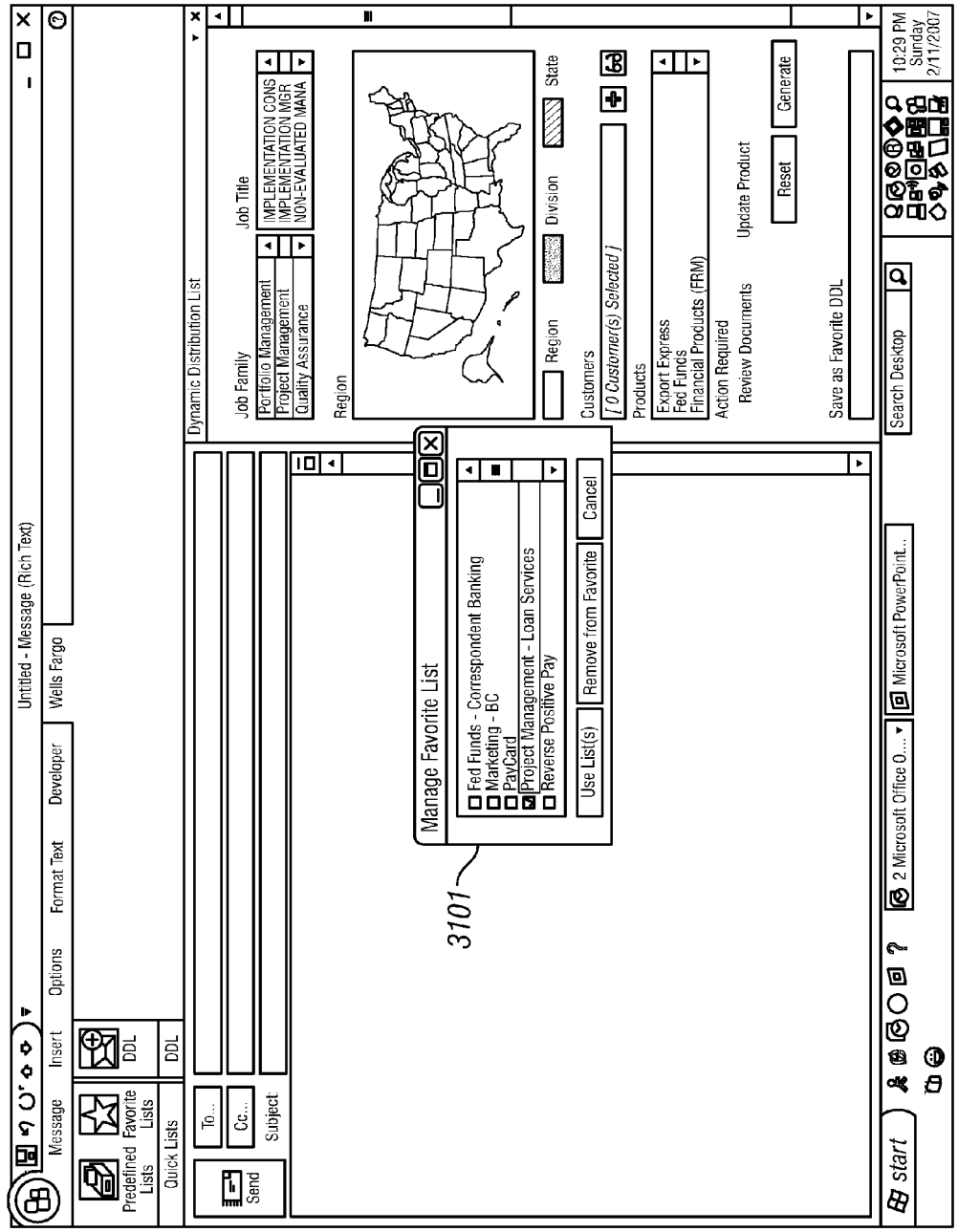

As shown in the view 3000 of the user interface of the messaging client, the system also provides the capability of having predefined lists and favorite lists. Upon selecting 'Favorite Lists,' the publisher is presented with a text box 3001 wherein a list of the publishers' favorite DDLs is displayed. The publisher is enabled to add a DDL to the 'Favorites' list by entering a name for the list in a 'Save as Favorite DDL' field before generating the list. Each of the DDLs in the favorites list is selectable, for example by placing a check in a checkbox associated to the DDL, as shown in FIG. 27. Additionally, by selecting a 'Use List(s)' button, one or more selected lists are used to populate the "To:" field in the message header with the appropriate email addresses, as shown in FIG. 31. By selecting a 'Remove from Favorites' button, the DDL is deleted from the favorites list.

Figure 32:
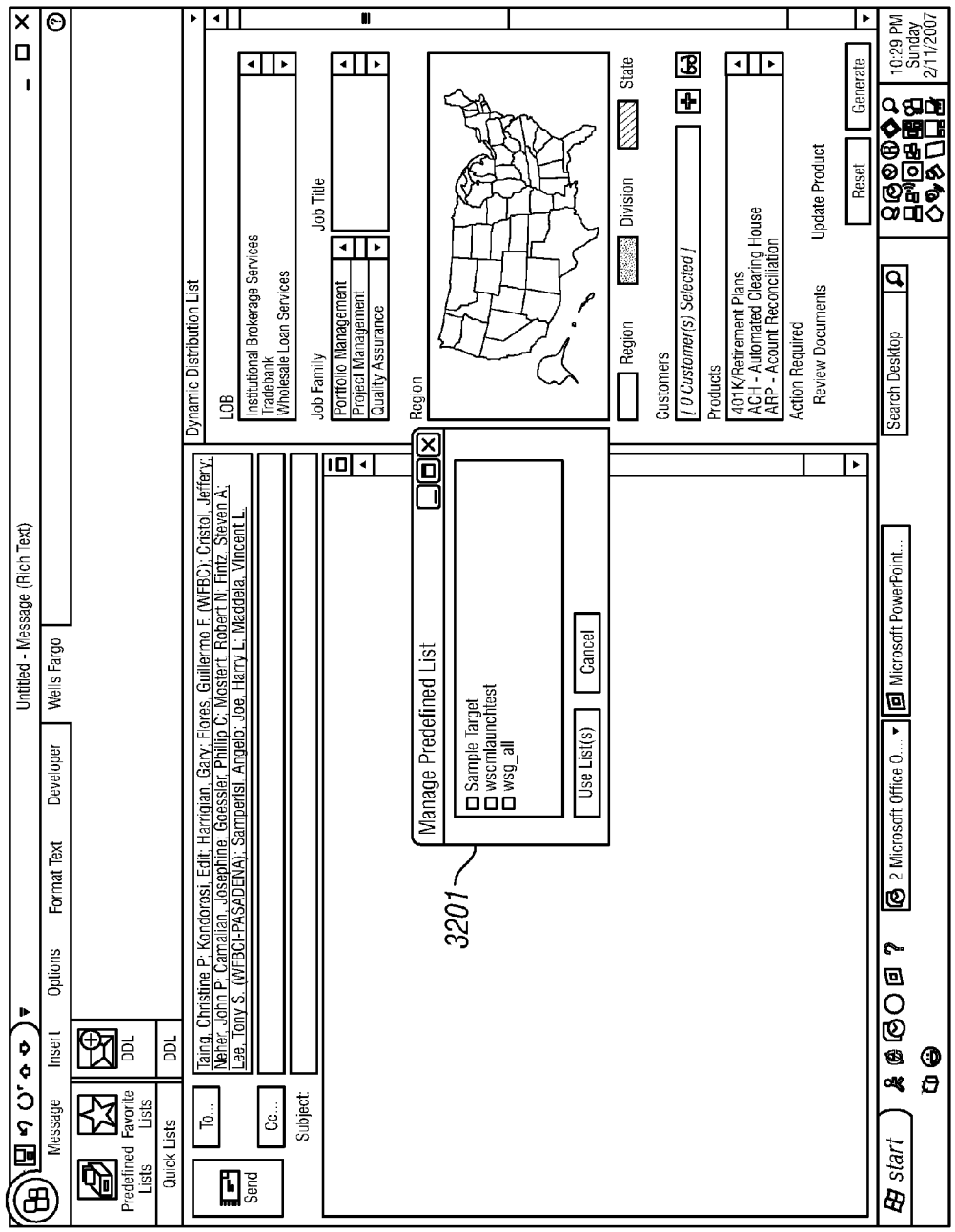

As shown in FIG. 32, management of predefined DDLs is similar to management of favorites, wherein the publisher goes through an analogous process of selecting DDLs from a selectable list displayed in a text box 3201.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method of addressing and distributing electronic communications via an enterprise computer system comprising a database, a rules engine, a communication network, and different types of user devices connected to each other via the communication network, the enterprise computer system for automated coordination and organization of electronic communications in a business enterprise, comprising:

receiving author content for a communication from an author via one or more of the user devices, the author content being received by any tool selected by the author from among a plurality of authoring tools, the plurality of authoring tools providing the author with different user interfaces for authoring the content, the system providing a plurality of communication templates that allow the author diverse format choices that can be reused, the system further providing reusable content that the author can select from to facilitate rapid publishing;

receiving configuration information for a plurality of recipient-configurable intelligent filters via one or more of the user devices, the configuration information for the filters being received from employees of the business enterprise, wherein the employee configures the employee's participation map;

storing profiles of employees in the database, the profiles describing content interests of the employees and roles of the employees within the business enterprise;

defining, by the rules engine, attributes of target recipients of the communication, the rules engine comprising at least one business rule that defines the attributes of the target recipients of the communication based on the participation map;

querying the database to identify employees that satisfy the at least one business rule;

automatically generating a list of the target recipients based on the identification of the employees that satisfy the business rule, wherein the list of target recipients includes employees of the business enterprise;

automatically addressing the communication to the target recipients;

electronically broadcasting the communication to the list of target recipients via the communication network of the business enterprise; and wherein the communication is delivered to the list of target recipients via each recipient's preferred channel and using each recipient's user device and preferred viewing tool, wherein different channels and different viewing tools are used for at least some of the recipients relative to other ones of the recipients, the different channels including channels associated with the different types of user devices, the different viewing tools providing the recipient with different user interfaces for viewing the communication, and the different viewing tools corresponding to and overlapping with the plurality of authoring tools made available for selection by the author.

2. The method of claim 1, wherein the apparatus comprises the recipient's receipt preferences and subscriptions.

3. The method of claim 1, wherein the preferences comprise:

at least one channel through which the recipient wishes to receive communications;

message type;

content type;

opting in or out of a particular message type or content from a particular content owner; and subscriptions to particular services or regular reports.

4. The method of claim 3, wherein the preferences comprise intervals at which the recipient wishes to receive a particular content type.

5. The method of claim 1, further comprising means for the recipient to publish the preferences.

6. The method of claim 1, wherein the list of target recipients further includes non-employees of the business enterprise.

* * * * *